(12) United States Patent
Greenwald et al.

(10) Patent No.: US 8,196,781 B2
(45) Date of Patent: Jun. 12, 2012

(54) DISPOSABLE PUMP

(75) Inventors: Shlomo Greenwald, Ithaca, NY (US);
Zipora Greenwald, Ithaca, NY (US)

(73) Assignee: Intelligent Coffee Company, LLC, Scottsdale, AZ (US)

( * ) Notice: Subject to any disclaimer, the term of this patent is extended or adjusted under 35 U.S.C. 154(b) by 0 days.

(21) Appl. No.: 13/034,402

(22) Filed: Feb. 24, 2011

(65) Prior Publication Data

US 2011/0139827 A1    Jun. 16, 2011

Related U.S. Application Data

(63) Continuation-in-part of application No. 12/497,063, filed on Jul. 2, 2009, now Pat. No. 7,896,202, which is a continuation-in-part of application No. 11/209,016, filed on Aug. 22, 2005, now Pat. No. 7,578,419.

(60) Provisional application No. 60/642,311, filed on Jan. 7, 2005, provisional application No. 60/682,107, filed on May 18, 2005, provisional application No. 60/700,824, filed on Jul. 20, 2005.

(51) Int. Cl.
*B65D 37/00* (2006.01)
(52) U.S. Cl. ........ 222/207; 222/380; 222/504; 222/571; 222/333; 222/214; 29/888.02; 417/44.1; 417/417
(58) Field of Classification Search ............... 29/888.02; 417/44.1, 417; 222/1, 333, 380, 504, 571, 222/206–210, 212–215
See application file for complete search history.

(56) References Cited

U.S. PATENT DOCUMENTS

| | | |
|---|---|---|
| 2,254,833 A | 9/1941 | Ashkenaz |
| 2,554,570 A | 5/1951 | Harvey |
| 2,740,553 A | 4/1956 | Maynard |
| 2,849,159 A | 8/1958 | Kaufmann |
| 2,887,255 A | 5/1959 | Bauerlein |
| 2,979,231 A | 4/1961 | Witherspoon |
| 3,136,257 A | 6/1964 | Smith et al. |
| 3,258,166 A | 6/1966 | Kuckens |
| 3,386,622 A | 6/1968 | Cox et al. |
| 3,521,794 A | 7/1970 | Bijl |
| 3,606,595 A | 9/1971 | Takamizawa |
| 3,828,985 A | 8/1974 | Schindler |
| 3,893,594 A | 7/1975 | Carbine et al. |
| 4,102,610 A | 7/1978 | Taboada et al. |
| 4,334,640 A | 6/1982 | van Overbruggen et al. |
| 4,352,645 A | 10/1982 | Meyer |
| 4,356,937 A | 11/1982 | Simon et al. |
| 4,393,982 A | 7/1983 | Kuckens |
| 4,450,987 A | 5/1984 | Boettcher et al. |
| 4,496,292 A | 1/1985 | Panick et al. |
| 4,515,294 A | 5/1985 | Udall |
| 4,518,105 A | 5/1985 | Kuckens et al. |
| 4,598,845 A | 7/1986 | Ozdemir |
| 4,624,395 A | 11/1986 | Baron et al. |
| 4,708,266 A | 11/1987 | Rudick |

(Continued)

*Primary Examiner* — Kevin P Shaver
*Assistant Examiner* — Andrew Bainbridge
(74) *Attorney, Agent, or Firm* — Brown & Michaels, PC

(57) ABSTRACT

A disposable concentrate pump for use with a liquid reservoir, with the actuating solenoid mounted in the dispenser. The pump has a body with flexible walls, a top-cap, a seal-base and a nozzle, with a seal-rod extending from the top-cap to the nozzle, stretching the flexible walls of the body and creating a net restoring force on the seal-base. A seal-head on the seal-rod seals a central opening in the seal-head when pressed against a side of the seal-head by the net restoring force. Reciprocally moving the seal-head parallel to an axis of the pump body operates the pump.

16 Claims, 26 Drawing Sheets

U.S. PATENT DOCUMENTS

| | | |
|---|---|---|
| 4,722,372 A | 2/1988 | Hoffman et al. |
| 4,735,345 A | 4/1988 | Lee |
| 4,775,301 A | 10/1988 | Cartwright et al. |
| 4,909,712 A | 3/1990 | Mortensen |
| 4,921,131 A | 5/1990 | Binderbauer et al. |
| 5,114,047 A | 5/1992 | Baron et al. |
| 5,275,309 A | 1/1994 | Baron et al. |
| 5,405,050 A | 4/1995 | Walsh |
| 5,567,131 A | 10/1996 | McNaull |
| 5,615,801 A | 4/1997 | Schroeder et al. |
| 5,842,603 A | 12/1998 | Schroeder et al. |
| 5,915,930 A | 6/1999 | McNaull |
| 6,257,445 B1 | 7/2001 | Means et al. |
| 6,343,724 B1 | 2/2002 | Ophardt et al. |
| 6,398,081 B2 | 6/2002 | Bassi et al. |
| 7,093,774 B2 | 8/2006 | Martin |
| 2002/0148529 A1 | 10/2002 | Berndorfer et al. |

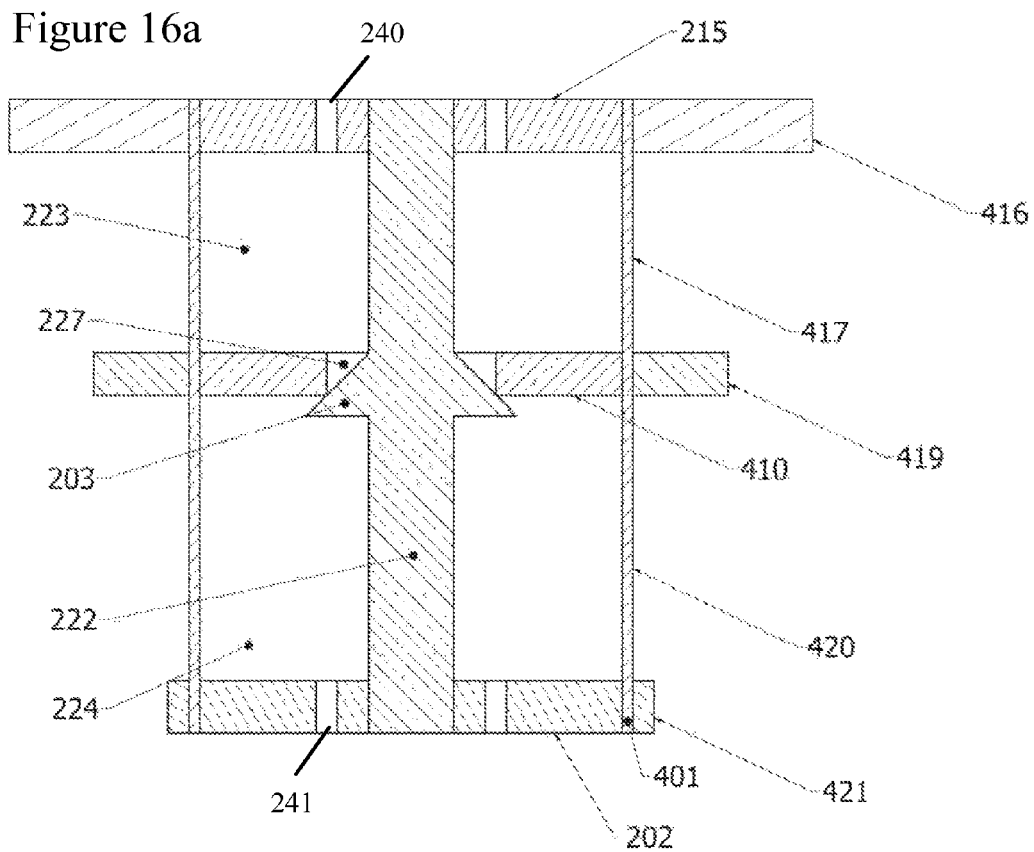

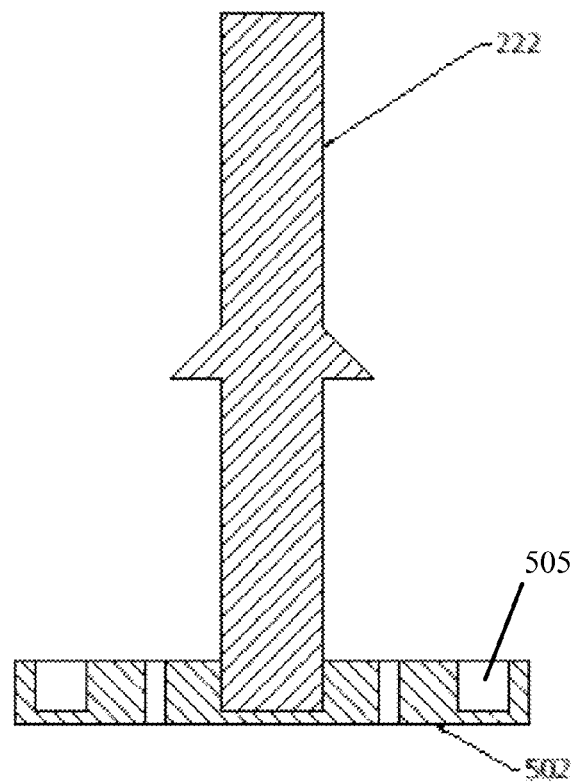
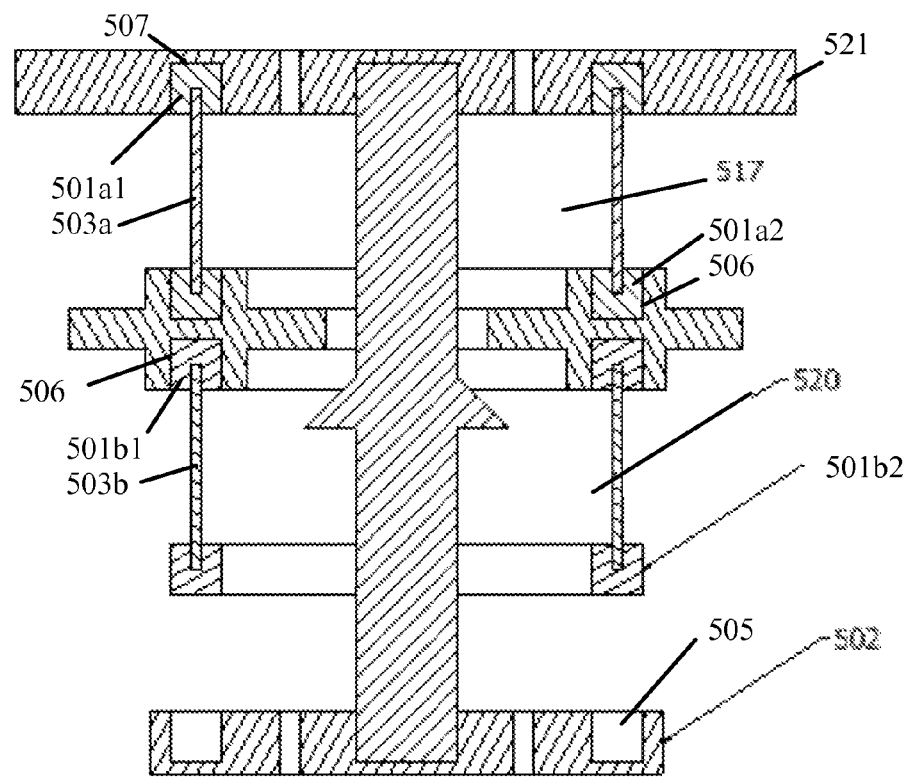

DISPOSABLE PUMP

REFERENCE TO RELATED APPLICATIONS

This application is a continuation-in-part of application Ser. No. 12/497,063, filed Jul. 2, 2009, and entitled "Disposable Integrated Bag and Pump", which issued Mar. 1, 2011, as U.S. Pat. No. 7,896,202, which was a continuation-in-part of application Ser. No. 11/209,016, filed Aug. 22, 2005 and entitled "Disposable Integrated Bag and Pump", which issued on Aug. 25, 2009, as U.S. Pat. No. 7,578,419. That application claimed the benefit under 35 USC §119(e) of U.S. Provisional Applications No. 60/642,311, filed Jan. 7, 2005, entitled "Beverage Dispenser with Disposable Pump", No. 60/682,107, filed May 18, 2005, entitled "Plastic Pump for Beverage and Soap Dispensing", and No. 60/700,824, filed Jul. 20, 2005, entitled "Super Quiet Disposable Pump". The aforementioned applications are hereby incorporated herein by reference.

BACKGROUND OF THE INVENTION

1. Field of the Invention

The invention pertains to the field of pumps for dispensing liquids. More particularly, the invention pertains to positive-displacement pumps.

2. Description of Related Art

In all beverage dispensers using liquid concentrate, from which beverages are extracted by hot or cold water, the dispensing of the concentrate liquid is done by a "pump". The most common is a peristaltic pump. The pump is part of the dispenser and the concentrate liquid bag is connected to the pump on one side and the mixing water on the other side via special plastic tubing.

In order to ensure a high quality beverage dispenser it is essential to clean and sanitize especially the concentrate liquid dispensing system periodically to avoid the growth of bacteria which might be harmful to the customers and degrade the quality of the dispensed beverage. In the current liquid concentrate beverage dispensers, the cleaning procedure is labor intensive and requires basic technical skills that in most cases the service personnel do not have. Therefore the cleaning and sanitize procedure is done very rarely.

A second important requirement of a beverage dispenser which uses concentrate liquid is to achieve consistency in the mixing ratio for each cup. This requires concentrate liquid dispensing pump that will be able to change the dispensing rate of the concentrate liquid instantly and with very fine resolution on order of 1% or better. Such a pump is relatively expensive and requires sophisticate controller. Also it is desired to have a pump with large dynamical range.

It is known to include a pump or valve as part of a removable fluid reservoir in a dispensing system. These pumps are often incorporated into the reservoir structure, or built into a spout, dispensing tube or cap for the reservoir. In some cases, the pumps are designed to be disposable or recyclable with the reservoir. Some examples are shown in the following US patents:

U.S. Pat. No. 2,254,833 "Method and Apparatus for Controlling Intermittent Fluid Flow" (1941) shows a solenoid-actuated valve in a hospital intranasal feeding system. A solenoid coil surrounds the tube leading from the drip bottle, and valve is formed by a metallic member in the tube. The metallic member is reciprocated by electrical pulses in the coil, releasing quantities of liquid when the solenoid is actuated.

U.S. Pat. No. 2,887,255 "Liquid Measuring Device" (1959) is a washing-machine detergent dispenser. A solenoid coil surrounds an armature in a chamber, all formed into cap of detergent bottle. Detergent fills the chamber when the solenoid is inactive, allowing the armature to block the outflow from the chamber. When the coil is actuated, the armature moves up, blocking detergent flow into the chamber, and allowing the chamber to drain, dispensing a measured portion of detergent.

U.S. Pat. No. 3,258,166 "Dispenser for Liquids" (1966) shows a valve within an elongated spout of a jar for a liquid dispenser. A coil surrounds the spout and reciprocates the valve: ". . . while it oscillates the armature acts not unlike the plunger of a pump and actually forces the liquid through the nipple . . . is of particular advantage when the liquid is coffee extract . . . " If this design were used in a bag-in-box application, air can enter from the bottom of the spout when the valve is up—vents are provided in the rigid jar used in this patent which are not available in the bag-in-box. Also, this design relies on the liquid height in the vented jar to return the valve to its seat, so that the amount of liquid dispensed would vary depending on the amount of liquid in the reservoir, which would make it difficult to dispense consistent amounts of liquid.

U.S. Pat. No. 4,393,982 "Metered Dispensing of Liquids" (1983) uses a coil surrounding a dispensing tube. A disk-like armature is attracted by the coil to compress a bellows in the tube to pump liquid. This design requires one-way valves above and below the bellows, which can become clogged, especially with more viscous liquids like concentrated beverages or soap.

U.S. Pat. No. 4,450,987 "Portion Control Liquid Dispenser" (1984) uses a solenoid coil surrounding a valve armature in a tube from a bag-in-box. The armature is purely a valve, and liquid runs out of the bag by gravity when the valve is open, it is not pumped. This is similar to U.S. Pat. No. 4,921,131 "Liquid Dispenser" (1990), which is a soap dispenser which also uses a solenoid coil to operate an armature acting as a valve in the bag tube.

U.S. Pat. No. 5,114,047 "Pump and Mixing Device for Liquids" (1992) is part of a juice dispensing system in which a plastic reservoir for juice concentrate is sold with an integrated disposable pump. A single compressible chamber acts as a pump, compressed by a lever arm leading from a motor. The pump design of this patent requires one-way valves, with the disadvantages explained previously. A continuation-in-part, U.S. Pat. No. 5,275,309 "One Way Valve with Unitary Valve Element" (1994) shows details of a number of embodiments of these valves.

U.S. Pat. No. 5,615,801 "Juice Concentrate Package for Postmix Dispenser" (1997) is another example of a disposable pump which is part of a bag-in-box system. The pump is a "Progressive Cavity" pump.

SUMMARY OF THE INVENTION

In order to eliminate the need of cleaning and sanitizing of the concentrate liquid dispensing system, increase its reliability, improve the consistency, simplify the dispenser design, and lower manufacturing cost, the invention provides an innovative disposable concentrate pump where the actuating solenoid is mounted in the dispenser.

The pump body is inserted into the solenoid. To make the system economically feasible, it is desirable that the disposable part of the pump cost only a small fraction of the cost of the concentrate liquid in the bag, and the innovative pump design of the invention will enable us to achieve this important requirement.

The disposable pump dispensing system of the invention can be used not only in beverage dispensing but also in chemical or manufacturing processes where a very accurate fluid mixing is required.

Four different pump embodiments will be described in detail below.

BRIEF DESCRIPTION OF THE DRAWING

FIGS. 16a and 16b show a cross section of a fourth embodiment of the disposable pump.

FIGS. 17a to 17d show the assembly steps of the fourth embodiment disposable pump of FIG. 16a.

FIGS. 22a to 22e show a second variation on the embodiment of FIG. 16, and an assembly method of the variation.

DETAILED DESCRIPTION OF THE INVENTION

Figure 1:
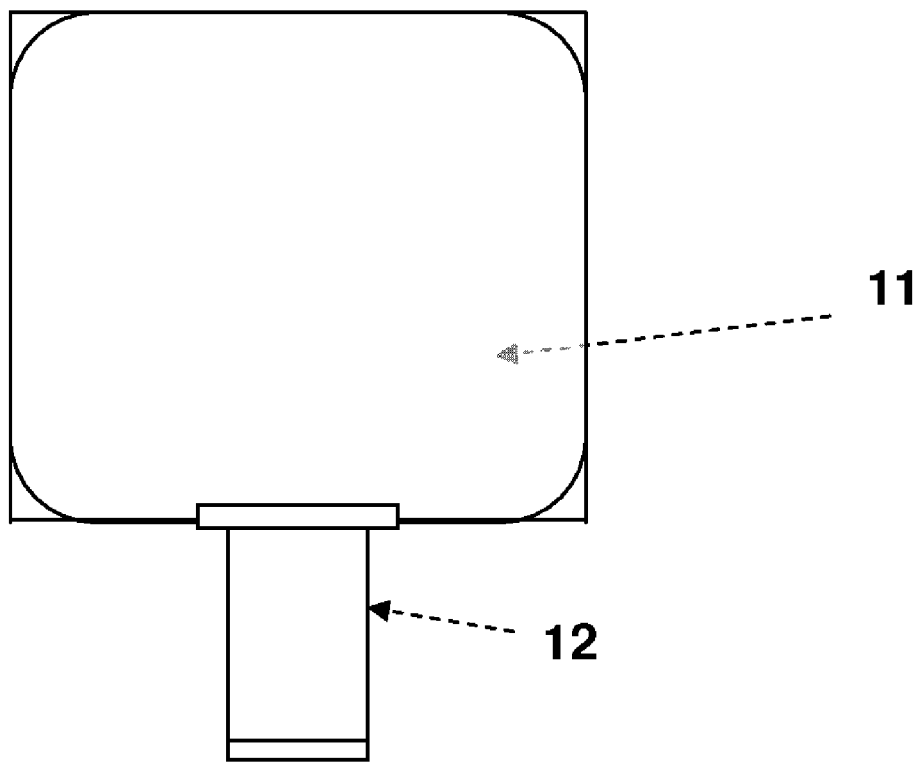
FIG. 1 shows a schematic representation of the disposable pump unit of the invention

In the following we will describe the four different embodiments of disposable pump 12 as can be seen in FIG. 1. The first embodiment is an innovative new Super Quiet Disposable Pump (SQDP) where the pump can be part of a disposable integrated collapsible bag and pump. One of the applications of the Disposable Pump is in beverage dispensers, using concentrate liquid in a collapsible bag, where the users have a direct interaction with the dispenser. In these cases it is very desirable that the pump operation will be very quiet and not generate noise which might be unpleased and annoying to the users.

The major advantages of the Disposable Pump are:
Eliminate the need of cleaning of the concentrated liquid dispensing system, which in current dispensers is a tedious and time consuming procedure.
Compactness in size.
Simplify the design of the dispenser
Lower the cost of manufacture of the dispenser.
The wide range of dispensing rate per unit time enables the same dispenser to operate with a wide range of concentrate liquid strengths. The same concentrate liquid dispensing system can be used for both a high mixing ratio product and low mixing ratio product.
Readily changeable mixing ratio of the dispensed beverage to satisfy customer preference.

Figure 2A:
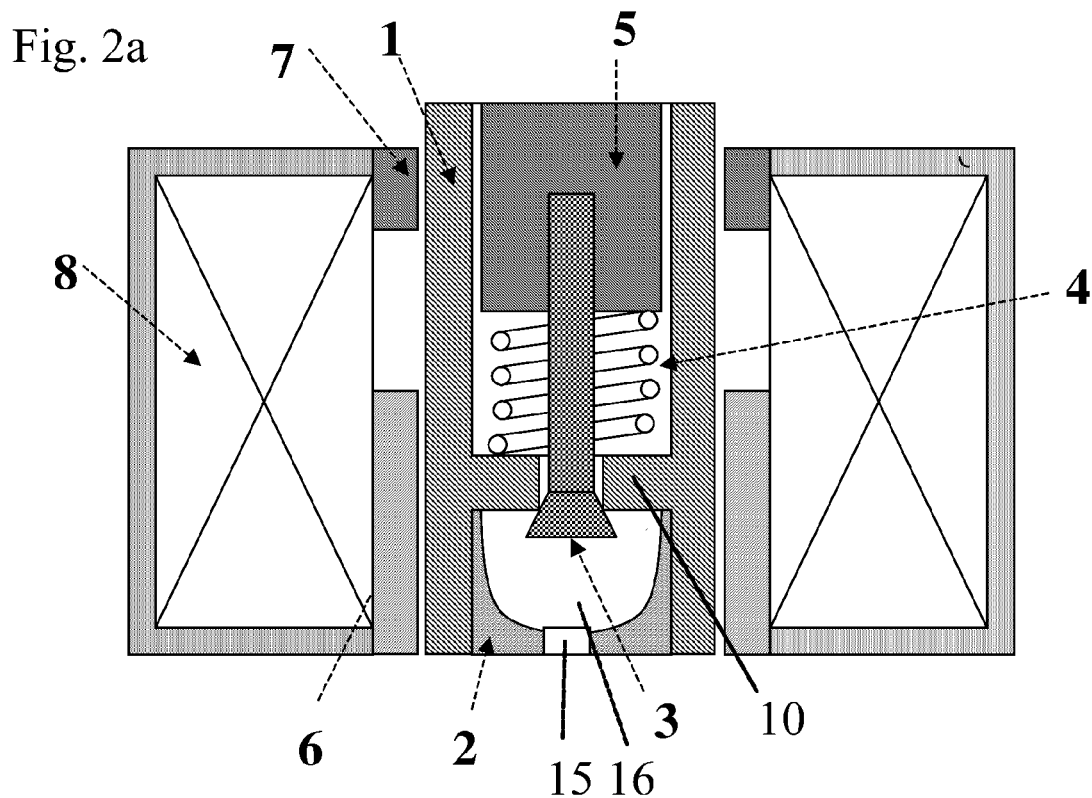
FIGS. 2a and 2b show a cross section of the Super Quiet Disposable Pump embodiment of the invention, assembled in the actuating solenoid.
Figure 2B:
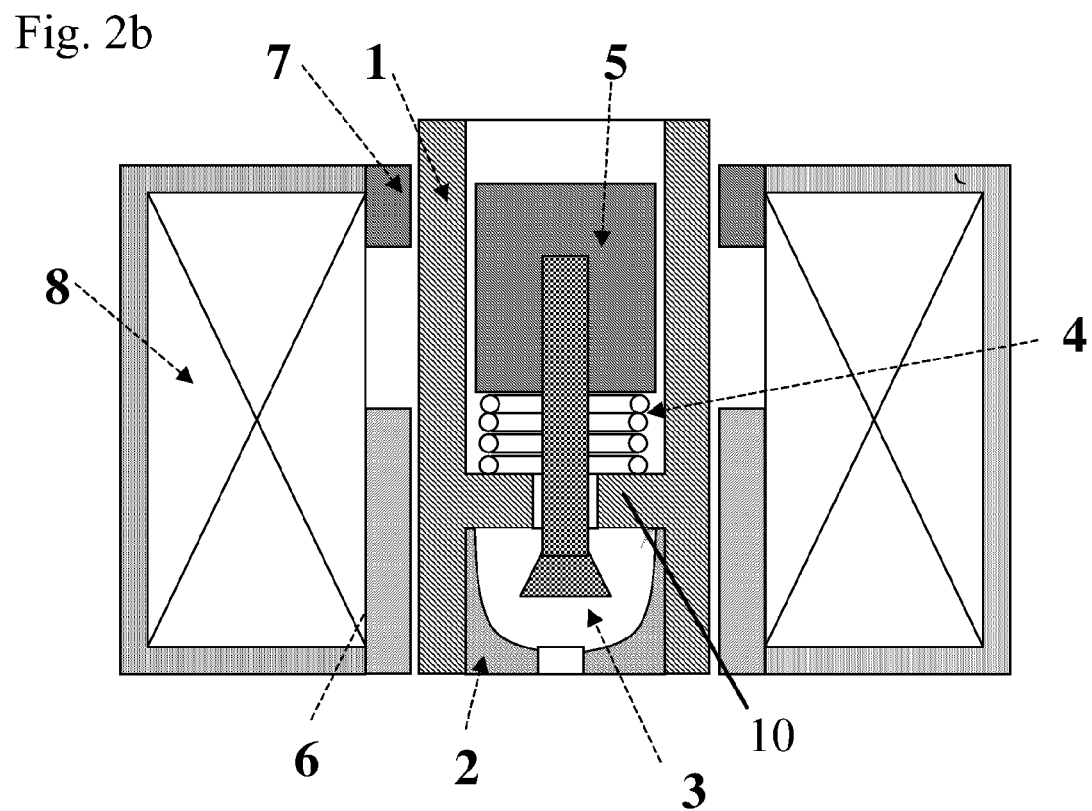

A cross section of the Super Quiet Disposable Pump (SQDP) assembled in the actuating solenoid can be seen in FIGS. 2a and 2b.

The pump is constructed from five parts: a Pump body 1, nozzle 2 and seal-head 3, all made of molded plastic, and a non-magnetic compression spring 4 made of metal such as Stainless Steel, and Plunger 5 made of a ferromagnetic metal such as Stainless Steel 440C. The actuating solenoid has three parts: Pole-Piece 6 and Magnetic flux focusing ring 7, both made of a ferromagnetic metal like the Stainless Steel 440C, and solenoid coil 8.

In the design of the SQDP, as can be seen in FIGS. 2a and 2b, the only moving metal part in the pump is the plunger 5, while the second part of the magnetic circuit, the pole-piece 6 is located outside the pump and is part of the actuating solenoid. This design allows the pump to operate without generating noise as will be described below. In addition, it simplifies the manufacturing and assembly which will lower the cost in commercial mass production.

Figure 4:
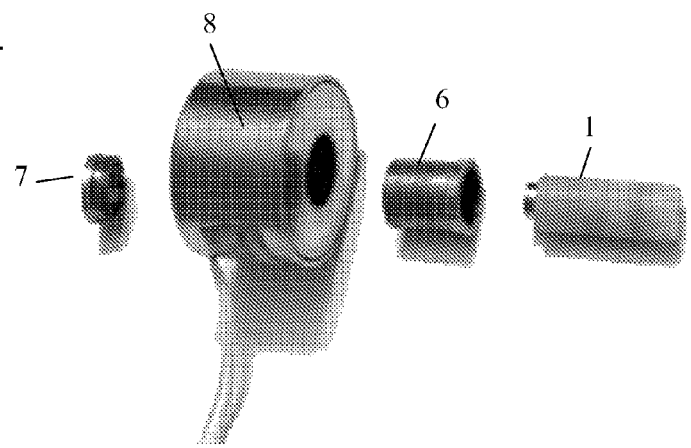
FIG. 4 shows an exploded view of the pump of the invention.
Figure 5:
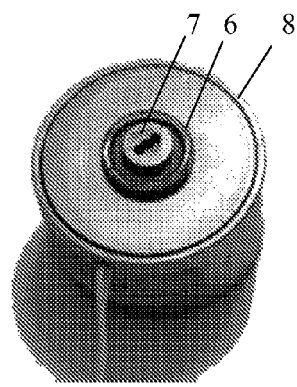
FIG. 5 shows a top view of the pump assembled in the solenoid.
Figure 6:
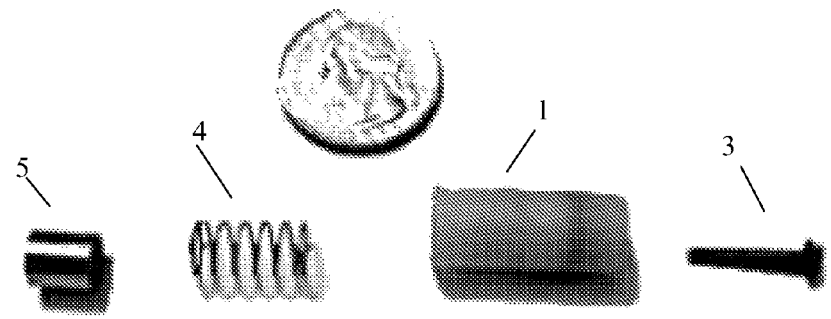
FIG. 6 shows an exploded view of the pump parts.

FIG. 4 shows, from left to right, the magnetic flux focusing ring 7, the solenoid coil 8, the pole piece 6, and the assembled pump. FIG. 6 shows an exploded view of the pump parts, from left to right, the plunger 5, compression spring 4, pump body 1, and seal-head 3.

In the magnetic actuator circuit the plunger 5 (the moving part) is facing the pole-piece 6 (the stationary part) and is separated from it by a short distance (gap) which will determine the total travel distance of the plunger when the magnetic actuator is actuated.

In this configuration the pulling force acting on the plunger due to the magnetic field vector is perpendicular to the surface of the plunger. The force intensity is proportional to one over the gap squared. In prior art pumps, as the plunger is accelerated and the gap becomes smaller the pulling force intensity is increasing very rapidly and the velocity and momentum of the plunger is increasing accordingly. Therefore, in order to stop the plunger a hard surface has to be introduced in its path. This usually is the pole piece surface. When the plunger hits the pole piece it reaches its maximum velocity and maximum momentum and a noise is generated.

Figure 3:
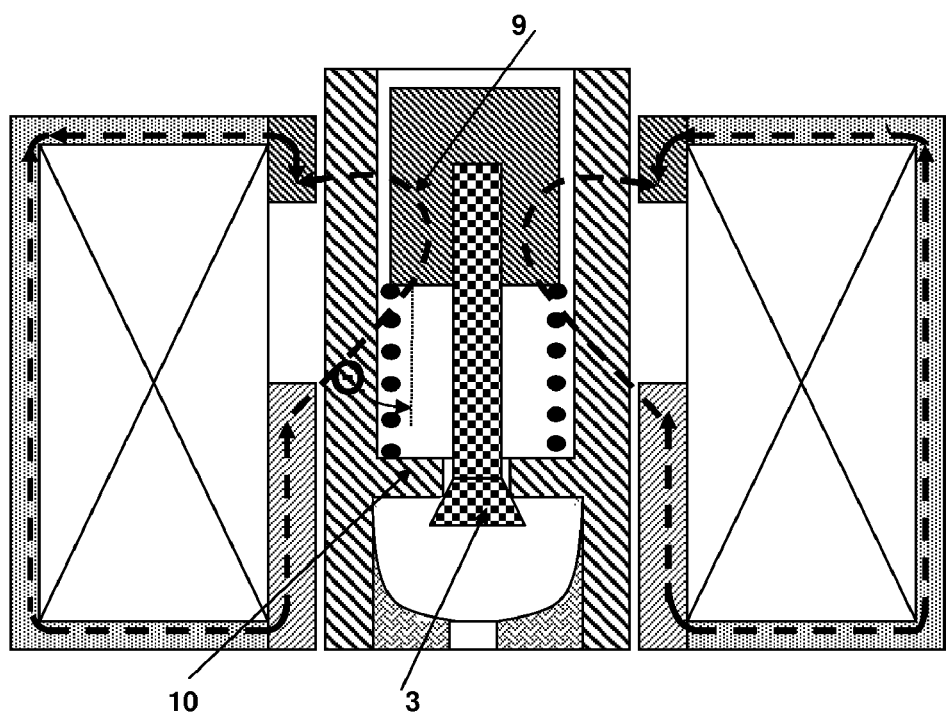
FIG. 3 shows the view of FIG. 2, with a magnetic flux line added.

In our innovative design of the SQDP pump, with the pole piece 6 located outside the pump, the magnetic flux 9 generated by the solenoid is not perpendicular to the surface of the plunger 5 but it intersects the plunger at an angle Θ as can be seen in FIG. 3. Therefore the magnetic field vector has two components: a first component in the longitudinal direction $H_z$, and a second component in the radial direction $H_r$. The longitudinal magnetic field component, $H_z$, which is proportional to $\cos(\Theta)$, is the one which pulls the plunger 5 down to decrease the distance between the plunger 5 and the pole piece 6. As the plunger 5 is moving down towards the pole piece 6 the intersection angle, $\Theta$, of the magnetic flux 9 with the plunger 5 is increasing and the pulling force due to the longitudinal magnetic field $H_z$, which is proportional to $\cos(\Theta)$, is decreasing. As the plunger 5 is moving down the angle $\Theta$ is increasing and when its value is approaching ninety degrees, the pulling force on the plunger 5 becomes very small. On the other hand, the restoring force due to the spring 4, $F_s$, which is proportional to the plunger 5 displacement, is increasing. Because $F_s = K \Delta Z$ where K is the spring 4 constant and $\Delta Z$ is the amount of the spring compression by the plunger moving down, when the restoring force of the compression spring 4 becomes larger then the pulling force due to the magnetic field $H_z$ the plunger 5 movement will be slowed down to zero (FIG. 2b). Since the plunger 5 velocity is brought to zero without hitting the pole piece 6 or any other solid surface it does not generate any noise.

At this point the plunger 5 will reverse its motion and will be pushed upwards by the compression spring 4. If the current pulse width provided to the solenoid 8 is shorter then the time it takes to bring the plunger 5 velocity to zero, the plunger 5 will be pushed back all the way to its starting position by the compression spring 4. But if the current pulse width provided to solenoid 8 is longer, then plunger 5 will move down until the compression spring 4 is completely compressed as can be seen in FIG. 2b and it will be held in this position by the solenoid magnetic field. In this case the fully compressed spring 4 and the plunger 5 pressing on top of it will prevent the liquid from flowing out.

The plunger 5, rigidly connected to the seal-head 3, is pushed back to its starting position (FIG. 2a) by the compression spring 4 and will be stopped when the seal-head 3 hits the seal-base 10. Since the seal-base 10, which is part of the pump body 1, is made of plastic and since the seal-head 3 is also made of plastic, and in addition they touch each other only at a very small cross section, as can be seen in FIG. 2a, the noise generated by the impact of the seal-head 3 on the seal-base 10 is very low. Also the noise generated by the impact of two plastic bodies has relatively lower frequency components then the noise generated by the impact of two metallic bodies. Therefore it will be damped more strongly by the liquid in the pump.

SQDP Design Considerations a. The operating pulse voltage width ("ON" time) to the pump solenoid 8 has to be shorter then the time it takes to bring the plunger 5 velocity on its way down to zero. This is required to insure that the plunger 5 will not start to oscillate.

b. At maximum operating rate of strokes/sec. the time duration of the "OFF" time has to be long enough to allow the plunger 5 to reach its starting position. Otherwise, the dispensing rate per stroke will not be the same when operating the pump at maximum frequency of strokes/sec as when the pump is operating at lower frequency of strokes/sec.

c. The total numbers of coils in the compression spring 4 has to be such that when the plunger 5 begins to move upward the coils do not touch each other and the gap between each coil is large enough to allow the liquid to flow in, since no vacuum can be generated in the space under the plunger enclosed by the spring. This is required to make sure that the plunger 5 will be pushed back by the compression spring 4 at minimum time.

Pump Operation

The seal head 3 which is rigidly connected to the plunger 5 is pulled by the compression spring 4 into the seal base 10 opening and seals the bag 11. When the solenoid 8 is actuated by a short voltage pulse, of the order of few milliseconds, the plunger 5 is pulled down and;

A) The seal head 3, which is rigidly connected to the plunger 5, will move away from the seal base 10 and open the seal.

B) The moving plunger 5 increases the pressure of the fluid that is located between the plunger 5 and the seal base 10. Since fluid is incompressible it will be forced by the moving down plunger 5 to flow out through the open seal and the small opening in the nozzle 2 and some of it will flow back to the top of the plunger 5 through the gap between the plunger 5 and the pump body 1.

C) Since vacuum can not be generated above the moving down plunger 5 the volume above the plunger 5 that is equal to the fluid that was pushed out by the plunger 5 will be refilled by suctioning liquid from the collapsible bag 11.

This process (dispense phase) continues until the velocity of the plunger 5 will be slowed to zero by the compression spring 4. At this moment the plunger will reverse its motion and will be pushed upward by the compressed spring 4 and;

D) The seal head 3, which is rigidly connected to the plunger 5, will move upward and because of its cone shape it will start to narrow the opening in the seal base 10.

E) The upward moving plunger 5 increases the pressure of the fluid that is located between the top of the plunger 5 and the bag 11. Since fluid is incompressible it will be forced by the upward moving plunger 5 to flow downward into the empty spaced left behind by the upward moving plunger 5. This process (filling phase) continue until the seal head 3 hit the seal base 10.

As the plunger 5 is moving upward to it starting position the seal head 3 is moving with it deeper into the opening in the seal base 10 and the gap between the cone shape seal head 3 and the outer rim of the opening in the seal base 10 become smaller and smaller. Since during the filling phase the pressure of the liquid in the volume under the plunger 5 is equal to the pressure of the liquid in the nozzle 2 so there is no extra pressure to force the liquid out through the nozzle 2, and the opening in the seal base 10 becomes smaller and smaller as the plunger is moving upward, very little liquid (if any) flows out during the filling phase.

If the time interval between two successive strokes is larger then the time it takes compression spring 4 to push plunger 5 all the way to its starting position, the liquid dispensed in each stroke will the same, independent on the number of strokes per second.

Second Embodiment

Figure 7A:
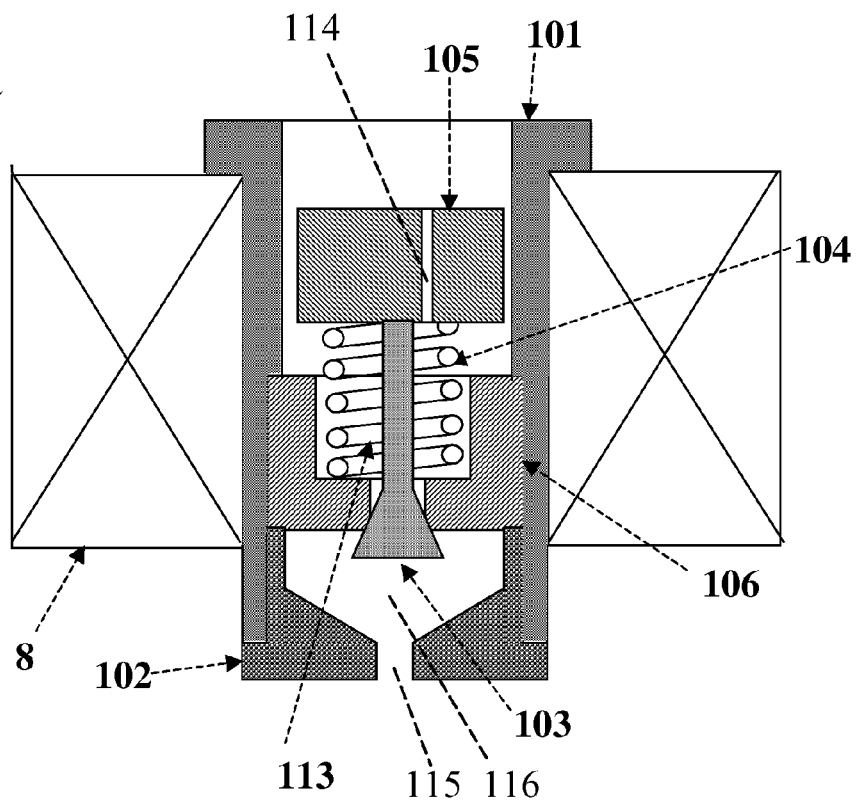
FIGS. 7a and 7b show a cross section of a second embodiment of the invention, in which the pole piece is in the pump body.
Figure 7B:
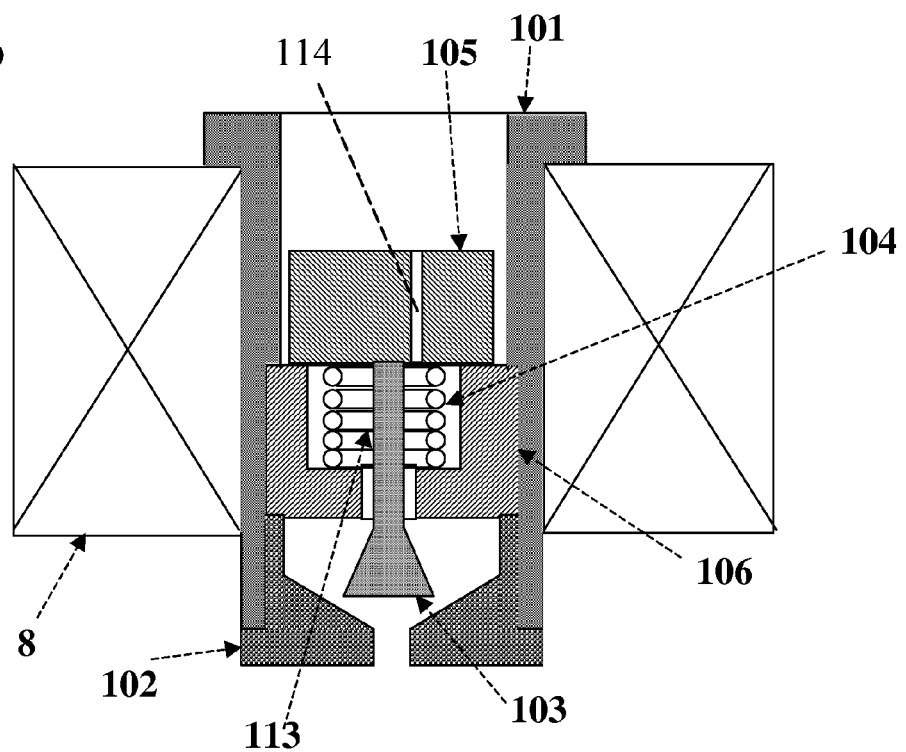

The second embodiment of the disposable pump can be seen in FIGS. 7a and 7b, with FIG. 7a showing the position of the pump with the coil 8 inactivated, and FIG. 7b showing the position of the pump with the solenoid coil 8 activated. One major difference between the second embodiment and the first embodiment of the SQDP described above, is that in the second embodiment the pole piece 106 is placed inside the pump body 101. The seal head 103 is connected rigidly to the plunger 105 similar to the SQDP. In this configuration when the solenoid is actuated the magnetic flux is always perpendicular to the plunger 105 and the pulling force intensity due to the magnetic field $H_z$ is proportional to one over the distance between the plunger 105 and the pole piece 106 square. As the plunger 105 is accelerating and the gap between the plunger 105 and the pole piece 106 becomes smaller the pulling force intensity is increasing very rapidly and the velocity and momentum of the plunger is also increasing accordingly until the plunger 105 hits the pole piece 106 as can be seen in FIG. 7b.

In order to avoid "hang-up" and allow the compression spring 104 to push the plunger 105 upward immediately after it reaches the pole piece 106 and it seals the compression spring 104 cavity 113 inside the pole piece 106, a narrow passage 114 is provided through the plunger 105 for the liquid to flow into the compression spring 106 cavity 118, to fill the empty space that is left behind when the plunger 105 is in its initial state of moving upward. This is accomplished by machining, close to the center, a small diameter vertical hole 114 through the plunger 105 as can be seen in FIG. 7a. Later on the liquid flows in through the opening between the plunger 105 and the pump inner wall.

If the current pulse width provided to solenoid coil 8 is long, after the plunger 105 reaches the pole piece 106 and seals the compression spring 104 cavity 118, it will be held in this position by the solenoid 8 magnetic field as can be seen in FIG. 7b. Therefore the liquid will not be able to flow out.

The principle of operation of this embodiment is similar to the one described above for the first embodiment SQDP.

The super quiet pump of FIGS. 2a and 2b and the second embodiment pump shown in FIGS. 7a and 7b both have a nozzle part 2 and 102 at the output. The nozzle has a small chamber 16 and 116 with an output hole 15 and 115. The nozzle chamber serves to prevent air from entering the pump.

When the pump is at the end of the dispense cycle (the plunger reached the pole piece as in FIG. 7b or 2b) the nozzle chamber 116 is full of liquid and acts as a barrier that will not allow air to enter the pump when the plunger is moving up. Since the output hole 115 in the nozzle is relatively small the liquid will not readily flow out from the nozzle chamber. A pump without the nozzle chamber was tested, and some air was able to enter into the pump. When the nozzle chamber was added, with a relatively small exit hole, no air entered the pump.

Third Embodiment

Figure 8:
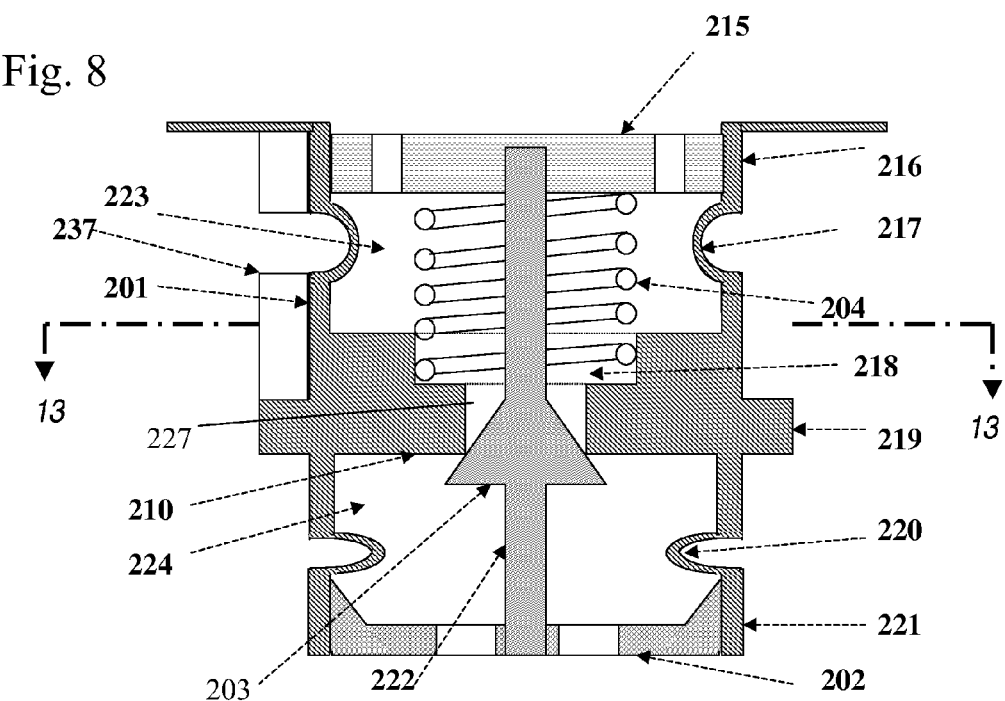
FIG. 8 shows a cross section of a third all plastic embodiment of the invention.

A cross section of the third embodiment of the All Plastic Disposable Pump (APDP) can be seen in FIG. 8. One of the advantages of this pump is, that it is allows manufacturing all the pump parts by a plastic molding process.

As can be seen in FIG. 8, the pump of this embodiment is constructed from five parts: pump body 201, top cap 215, nozzle 202, seal-rod 222 with a seal head 203, all made of plastic, and compression spring 204, preferably made of stainless steel.

The pump body 201 can be divided into five sections which are; the top neck 216, the top flexible section 217, seal base 210, bottom flexible section 220, and bottom neck 221. The pump is divided into two chambers, the upper chamber 223 and the lower chamber 224. The two chambers are connected via the opening 227 in the seal base 210 that is sealed by the seal head 203. The seal base 210 is pushed downward by the compression spring 204 against the seal head 203. The top cap 215 has at least one vertical through hole to allow the fluid from the collapsible bag (not shown) to flow into the upper chamber. The rigid seal rod 222 which passes through the opening 227 in the seal-base 210, is connected to the top cap 215 on one side and to the nozzle 202 on the other side. After the pump is assembled the top cap 215 and the nozzle 202 are fastened, typically by ultrasonically welding or gluing, to the top neck 216 and the bottom neck 221 respectively to form sealed joints at the top and the bottom.

Figure 9A:
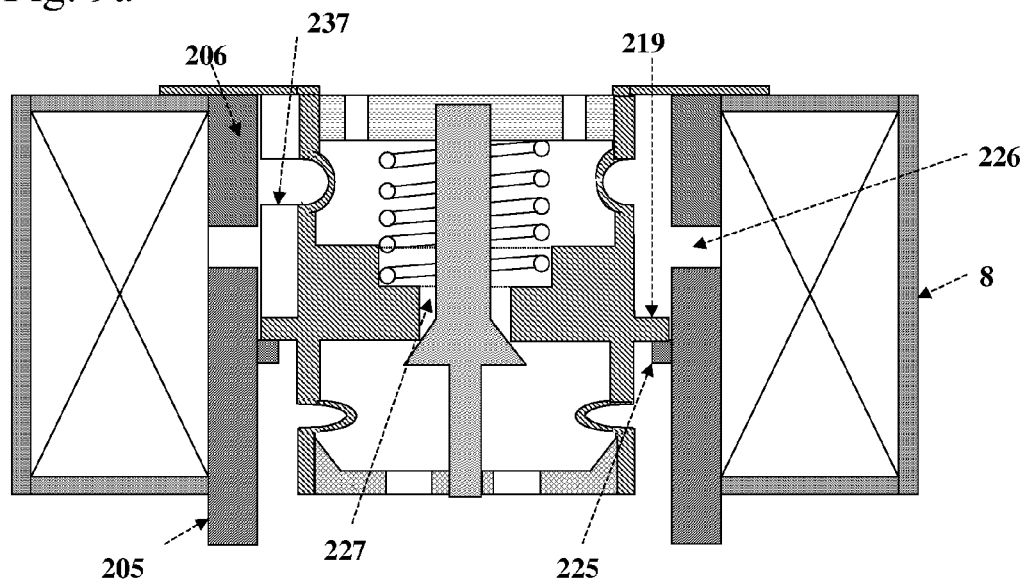
FIGS. 9a and 9b show a cross section of the embodiment of FIG. 8, inserted in a solenoid actuator.
Figure 9B:
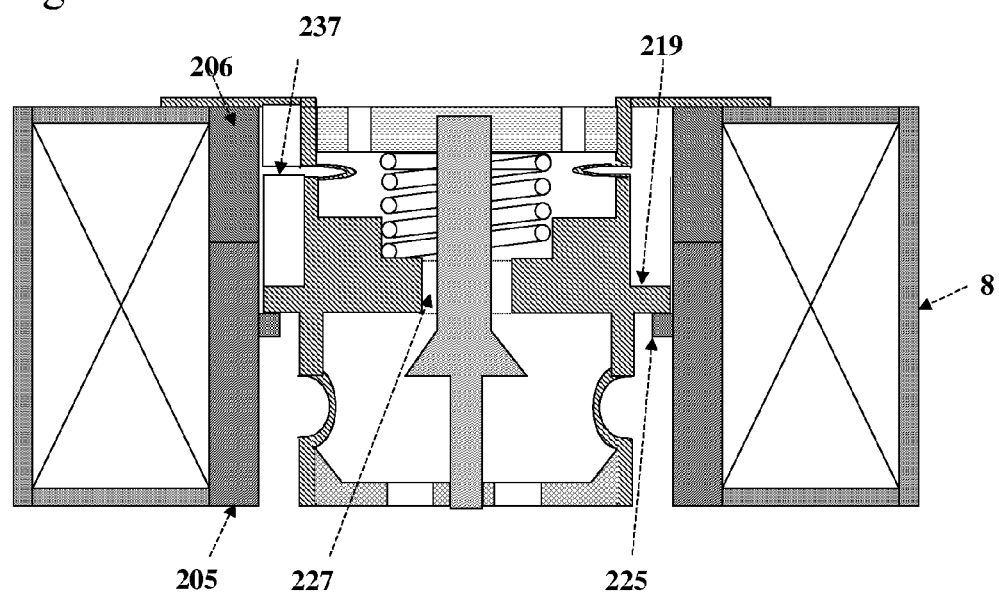

FIGS. 9a and 9b show the pump inserted in a solenoid 8 actuator. FIG. 9a shows the pump status when the solenoid 8 is not activated, and FIG. 9b shows the pump status when the solenoid 8 is activated. It will be understood that a collapsible bag (not shown) is connected to the top of the pump to form an integrated disposable bag pump.

The top part 216 of the pump is firmly held against the top part of solenoid coil 8, so it cannot move vertically when the solenoid 8 is actuated. Nozzle 202 is also rigidly connected to the top cap 215 by the seal rod 222, and cannot move vertically when the solenoid 8 is actuated. The coupling between the pump and the plunger 205, typically in the form of a ring or tabs 219, rests against the plunger 205 lifting ring or tabs 225 as can be seen in FIG. 9a.

Figure 13:
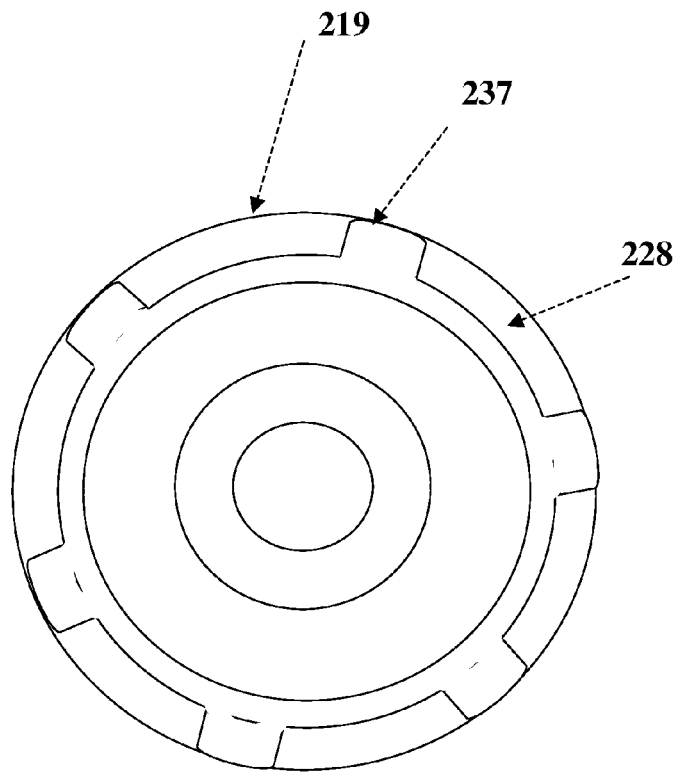
FIG. 13 shows a cut-through of FIG. 8, along the lines 13-13
Figure 9C:
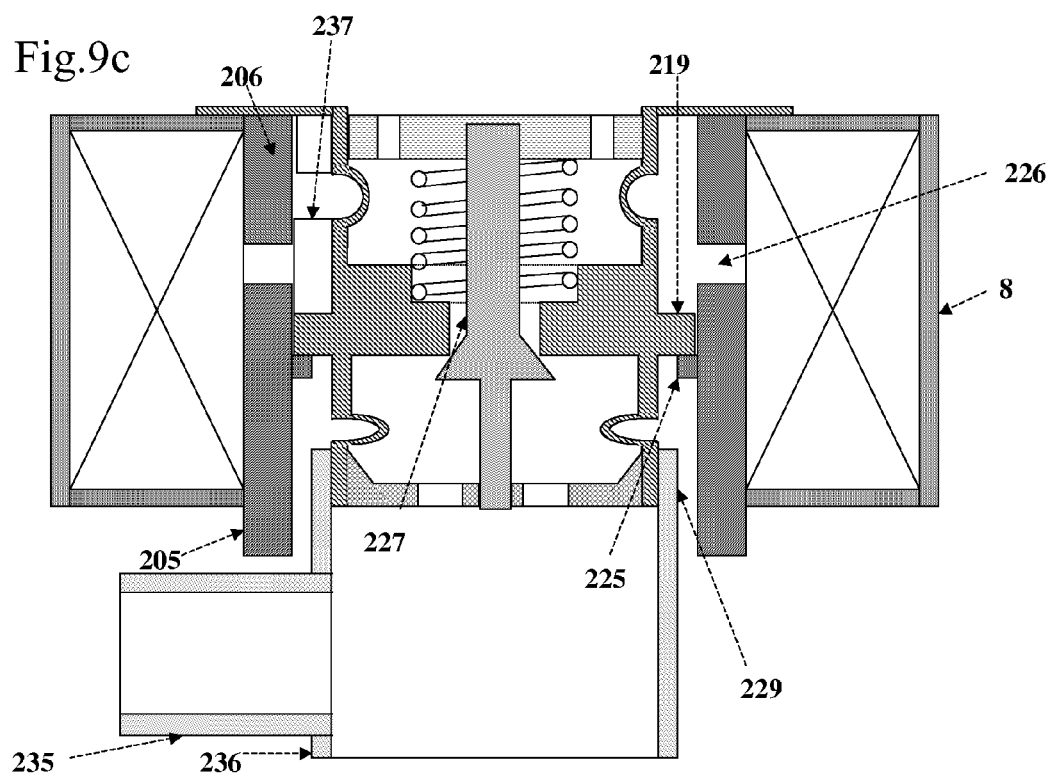
FIG. 9c shows a cross section of the embodiment of FIG. 8, inserted in a solenoid actuator, with a fluid mixer attachment.

In a case where tight fitting between the pump and the inner bore of the solenoid 8 is desired, or where the pump body needs to be made sturdier, a series of ribs 237, as can be seen in FIG. 8 and FIG. 13, are constructed along the top neck 216 and seal base 210 with open channels 228 between the adjacent ribs to allow for air flow between the pump and the solenoid when the pump is actuated. Typically, at the lower part a gap is left open between the upper arm 229 of the water junction 235 and the plunger 205 to allow a free movement of plunger 205, as can be seen in FIG. 9c.

When the pump is actuated, only the middle part of the pump body, between the upper bellows 217 and the bottom bellows 220 moves, since the top neck 216 is connected rigidly to the top of solenoid 8, and nozzle 202 is connected rigidly to the top cap 215 by the rigid seal rod 222. This is important for many different applications. For example; if the APDP is used in a beverage dispenser to dispense liquid concentrate, the bottom neck 221 can be fitted via a water seal fitting directly into the incoming water to dispense the concentrate directly into the water. In this application, the bottom neck 221 is inserted into the upper arm 229 of the T-shaped water fitting, the incoming water enters through the middle arm 235, and the beverage is dispensed through the lower arm 236 as can be seen in FIG. 9c.

Figure 14:
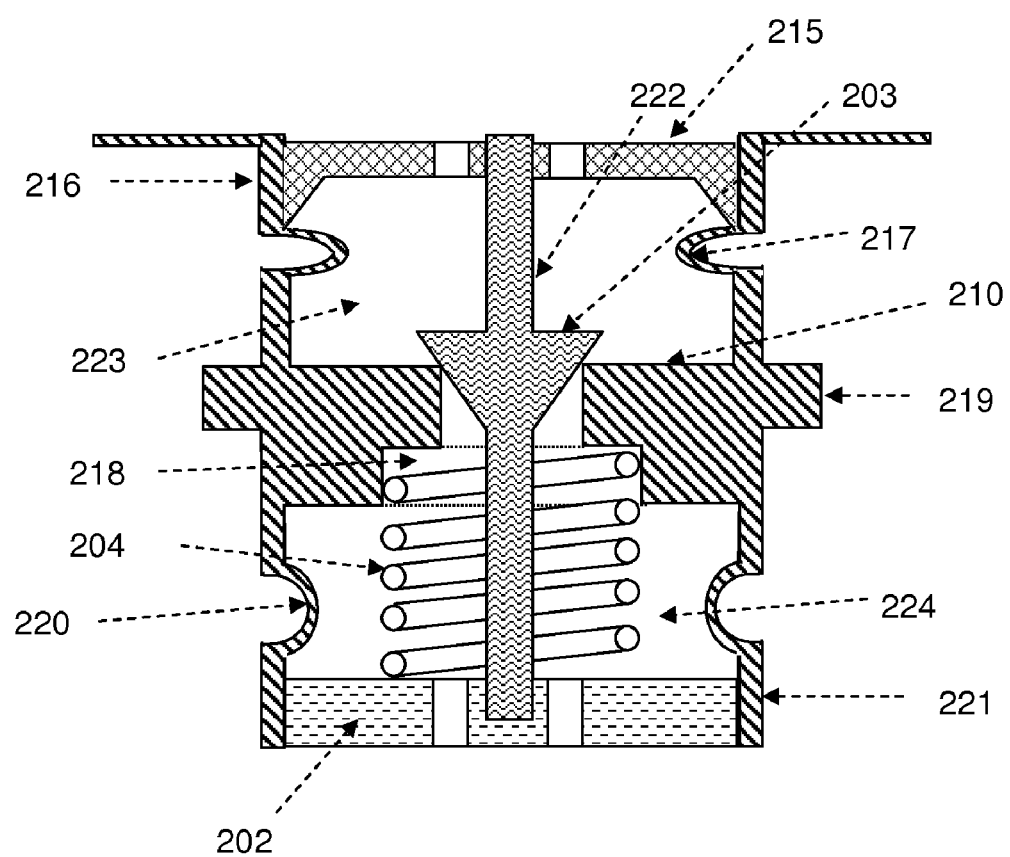
FIG. 14 shows a variation on the embodiment shown in FIG. 8, with the spring located in the lower chamber.

In FIG. 14 a second embodiment of the All Plastic Disposable Pump is shown. In this embodiment the spring 204 is positioned inside the bottom chamber 224 between the seal base 210 and the nozzle 202. In this embodiment the actuator (not shown) pushes the seal-base 210 downward and the spring 204 pushes the seal-base upward into the seal-head 203. This is in reverse to the actuation of the first embodiment of the All Plastic Disposable Pump as shown in FIGS. 9b and 9a, where the actuator pushes the seal-base 210 upward and the spring 204 pushes the seal-base 210 downward.

Figure 15:
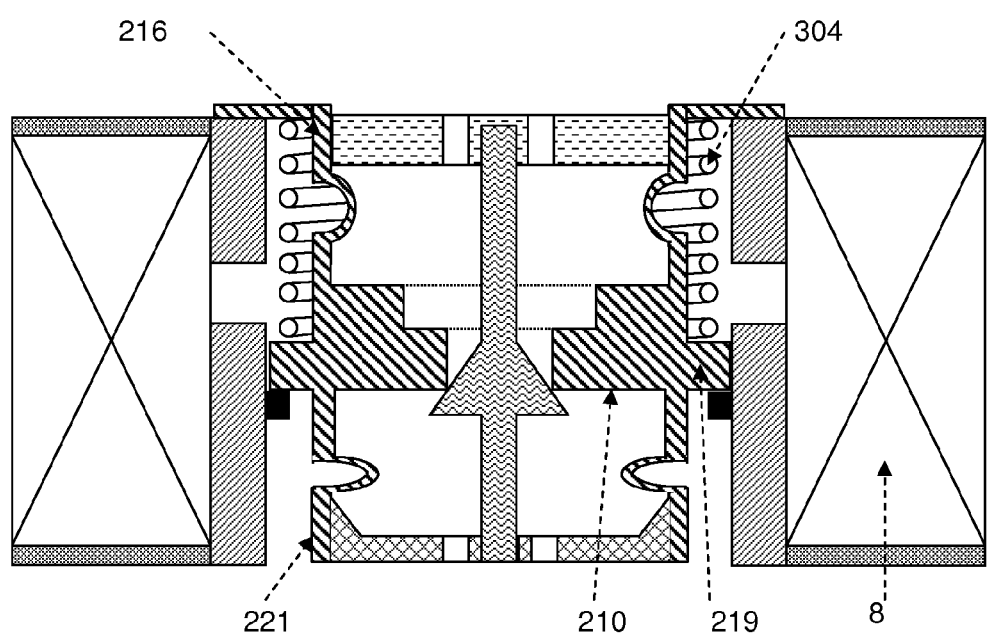
FIG. 15 shows a variation on the embodiment shown in FIG. 8, with the spring located outside the pump body.

In FIG. 15 a third embodiment of the All Plastic Disposable Pump is shown. In this embodiment the spring 304 is located outside of the pump body between the top-neck 216 and the seal-base 210 coupling means 219. It is also possible to place the spring 304 outside the pump body between the seal-base coupling means 219 and the lower neck 221.

As opposed to the embodiments shown in FIGS. 2 and 7, the All Plastic Disposable Pump does not require magnetic flux for actuation—it is only necessary to reciprocate the seal-base 210 up and down from a first position to a second position. Therefore the APDP can be also actuated by a pneumatic actuator or mechanical actuator within the teachings of the invention. In addition, since there are no inner moving parts, the All Plastic Disposable Pump of the invention can be used to dispense viscous fluids.

In the following we will refer to the solenoid actuator as shown FIGS. 9a and 9b, and use these figures to illustrate the pumping process. It will be understood that the same result can be achieved using pneumatic or mechanical actuator.

The All Plastic Disposable Pump Pumping Process

The top cap 215 is rigidly connected to the nozzle 202 by the rigid seal rod 222. Pump body 201 has two flexible sections: one 217 at the upper part of the pump and one 220 at the lower part as can be seen in FIG. 8.

As can be seen in FIG. 9a, when the solenoid 8 is not actuated, the compression spring 204, located in the upper chamber 223, expands the upper flexible section 217 and compresses the lower flexible section 220. This pushes seal base 210 downward against the seal head 203, isolating the upper chamber 223 from the lower chamber 224.

As shown in FIG. 9b, when the solenoid 8 is actuated by a voltage pulse, plunger 205 is pulled upward by the magnetic field to close the gap 226 between it and the pole piece 206. The seal-base 210, which is coupled to the plunger 205 via rings or tabs 219 and 225, is pushed upward a distance equal to the opening of gap 226 and upper flexible section 217 is compressed, lower flexible section 220 is expanded and spring 204 is compressed. When the seal base 210 is pushed upward, the upper chamber 223 volume is compressed while the volume of the lower chamber 224 is expanded, and the seal between the upper chamber 223 and the lower chamber 224 opens. Therefore the liquid from the upper chamber will be forced by the moving seal base 210 upward to flow from the compressed upper chamber 223 into the expanding volume of the lower chamber 224 through the now open seal. Because of the cone shape of the seal head 203, as the seal base 210 moves upward, the opening 227 between the upper chamber 223 and the lower chamber 224 increases in size and the resistance to the fluid flow through the seal opening from the upper chamber 223 to the lower chamber 224 decreases.

When the actuating voltage pulse goes to zero (that is, the solenoid 8 is deactivated), the now compressed spring 204 will push the seal base 210 back to its starting position until the moving seal base 210 is stopped by the seal head 203. When the seal base 210 is moving downward, the upper chamber 223 volume expands and the lower chamber 224 volume compresses. At the same time, the upper flexible section 217 expands and the lower flexible section 220 compresses. When the seal base 210 is moving upward, the upper chamber 223 volume compresses and the lower chamber 224 volume expands. At the same time, the upper flexible section 217 compresses and the lower flexible section 220 expands.

During the Dispensing Period, the lower chamber 224 is compressed back to its starting volume, and most of the liquid volume that entered the lower chamber 224 during the time when the seal base 210 was pushed upward and the lower chamber expanded will be dispensed through the nozzle 202 holes. A fraction of the liquid might flow back into the upper chamber 223. The ratio between the amount of liquid that will be dispensed to the amount that will be flowing back to the upper chamber 223 depends on the ratio of the integrated liquid conductivity of the nozzle 202 holes to the liquid conductivity of the opening 227 between the upper chamber 223 and the lower chamber 224. Also, as the seal base 210 is moving down the liquid conductivity of the opening 227 between the upper 223 and the lower 224 chambers is decreasing very rapidly while the liquid conductivity of the nozzle 202 holes stays the same.

By designing the total volume change of the lower chamber 224 during the dispense period and the ratio of the total nozzle 202 conductivity (i.e. the total number of holes and the diameter of the holes) to the total integrated conductivity of opening 227, the total dispensed liquid volume per stroke can be determined.

During the dispensing period when the upper chamber 223 is expanding and lower chamber 224 is compressing, the increasing volume of the upper chamber 223 will be refilled by the liquid drawn in from the collapsible bag (not shown) through the openings in top cap 215 by the suction effect of the expanding volume of the upper chamber 223. A small amount of liquid might flow back from the lower chamber 224.

The time interval between successive strokes should be equal or greater to the dispensing period time, to ensure that the liquid quantity dispensed per stroke will be the same.

In applications where quiet operation is desired, a few different methods of operation can be chosen:

A) a pneumatic or mechanical actuator can be used in place of the electric solenoid coil 8 and plunger 205.

B) the solenoid 8, the plunger 205, and the pole piece 206 can be designed similar to the one explained above for the Super Quiet Pump, where the plunger 205 diameter is smaller than the pole piece 206 diameter, so the plunger 205 is not stopped by the pole piece 206, but rather its velocity upward is brought to zero by the compression spring 204.

C) In order to damp noise generated when the plunger 205 is pushed down by the compression spring 204, a special damping absorber can be mounted at the bottom of the plunger 205.

The Integrated Disposable Bag Pump (IDBP) system, using any one of the three different embodiments of the Disposable Pump, can be used very efficiently in many different applications. A number of these applications will be described below to illustrate the wide range of possible applications of the invention in different fields of use.

Beverage Machine in Home Refrigerators

Figure 10:
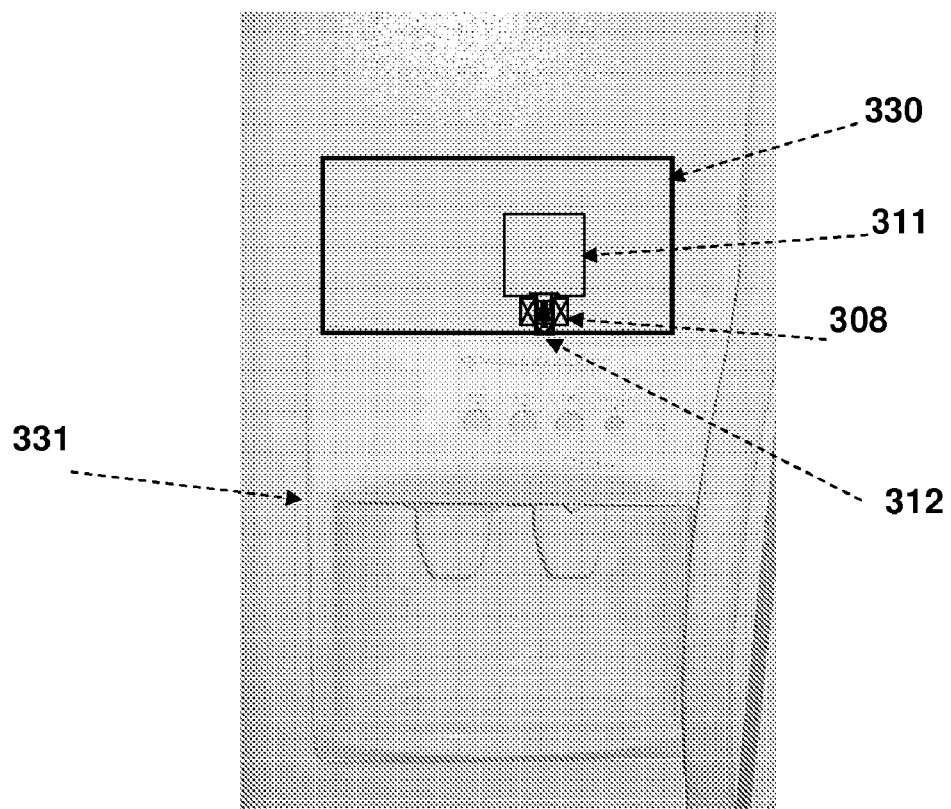
FIG. 10 shows a sketch of the invention mounted in a refrigerator door.

Many home refrigerators include the option of dispensing cold water or ice cubes through the refrigerator door. A dispenser incorporating the pump of the invention in the refrigerator or freezer door as can be seen in FIG. 10. The dispenser uses the available cold water to make cold beverage drinks which can include ice-coffee, ice-tea, and cold soft drinks. Adding a small chamber for a CO2 tank in the bottom of the freezer door enables us to provide carbonated soft drinks as well.

For the refrigerator dispenser all that is needed is a small solenoid 308 to actuate the pump 312 and a microcomputer based controller (not shown). The pump of the invention can be mounted on the freezer door in a "drop-door" 330 which will enable easy replacement of the empty bag and pump. Since the water is supplied to the refrigerator from a city water source, using a simple constant flow restrictor provides the dispenser with cold water at constant flow rate which will simplify the concentrate liquid dispensing control.

Sanitation Industry

The disposable pump and reservoir technology can be used to automatically dispense liquid soap in public restrooms, hotels bathrooms, hospitals, doctor offices, and residential homes which will improve the sanitation and minimize the chance of transmitting diseases. The All Plastic Pump is especially suited for this application since it can dispense high viscous substances.

Figure 11:
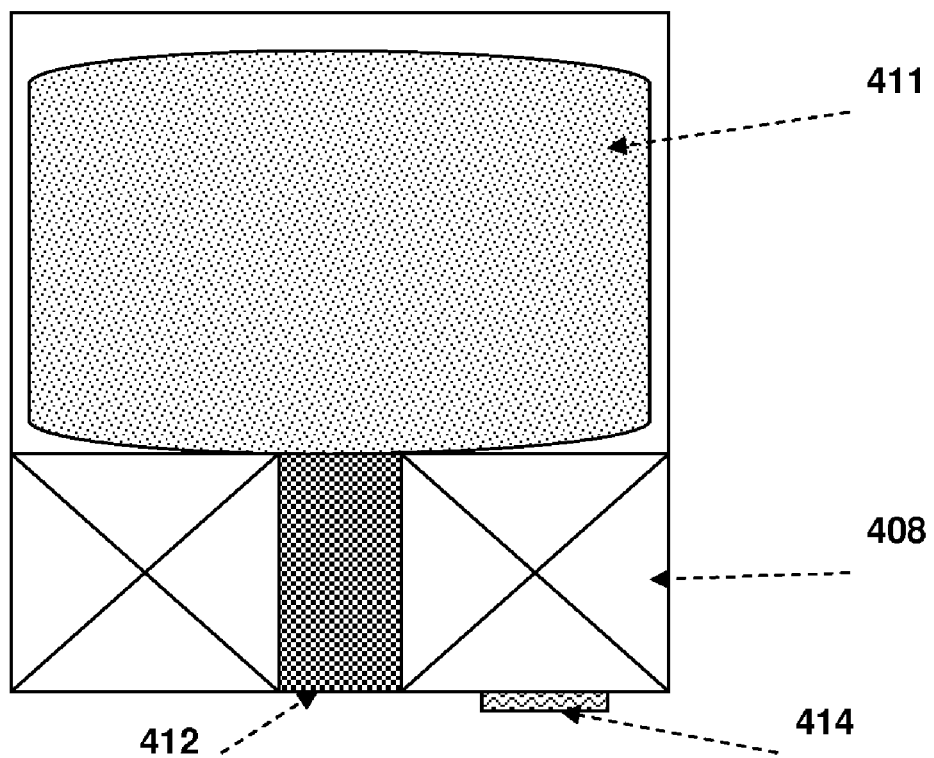
FIG. 11 shows a cross section of an embodiment of the invention, as used in a soap dispenser.

A schematic drawing of a soap dispenser using the pump of the invention can be seen in FIG. 11. The soap dispensing is triggered automatically by a motion sensor 414. So when a user inserts his hand under the dispenser the motion sensor 414 will turn on the actuator 408 and the pump 412 will dispense small drops of soap every stroke. When the user will move his hand out from under the dispenser the motion sensor 414 will turn the dispenser off.

Chemical Process

The disposable pump system can be used in chemical process where a very accurate quantity of two or more substances, in liquid form, has to be mixed automatically according to a preprogrammed profile for each substance.

Dispensing Corrosive Substance

The All Plastic Pump with the spring located outside the pump body is especially suited for these applications since no metallic parts will come in contact with the dispensed corrosive substance.

Manufacturing

Figure 12:
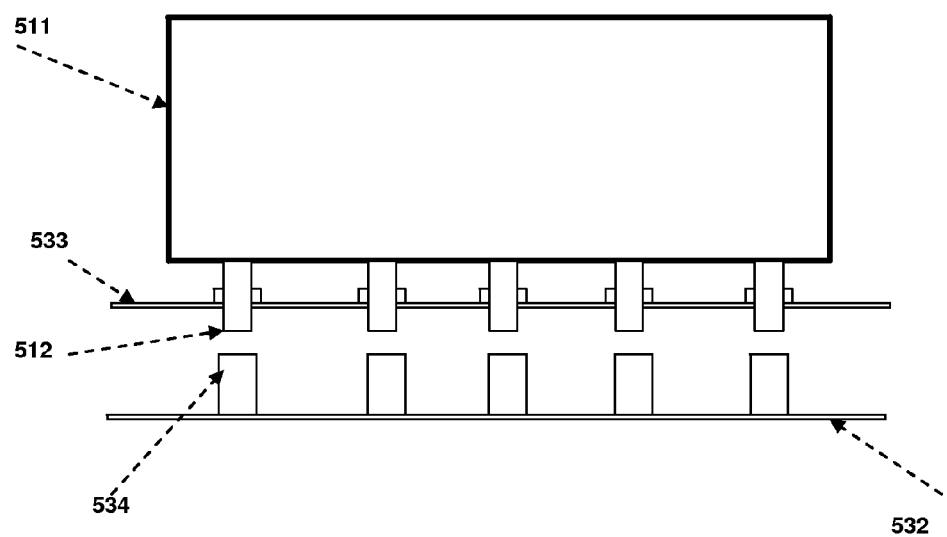
FIG. 12 shows a schematic representation of a number of the pumps of the invention, as they might be used in an assembly-line application.

In an automatic production line, a substance in liquid form may have to be mixed very accurately with a product 534 moving on a assembly line conveyer 532 as can be seen in FIG. 12. In order to increase the production rate per unit time, an embodiment of the All Plastic Disposable Pump (APDP) that does not require magnetic flux for dispensing can be used. An array of pumps 512 can be arranged in a row (or any other desired configuration) and connected to a single collapsible bag 511. The pumps 512 are spaced apart by the same distance as the product items 534 are spaced on the conveyer 532.

All the pumps 512 can be actuated be a single actuator 533 to simultaneously dispense into each one of the products 534 that are aligned with the pumps 512. In order to ensure continued operation, two dispensing systems can be mounted side by side and only one system arranged to dispense at a time. When the bag 511 in one system runs dry, the other system takes over. The operator can then replace the empty bag and pump with a new one. This system has many advantages: it is very compact in size, has a very accurate dispensing rate, is simple to actuate and maintenance-free, and it does not require any cleaning of the dispensing system.

Fourth Embodiment

Figure 16B:
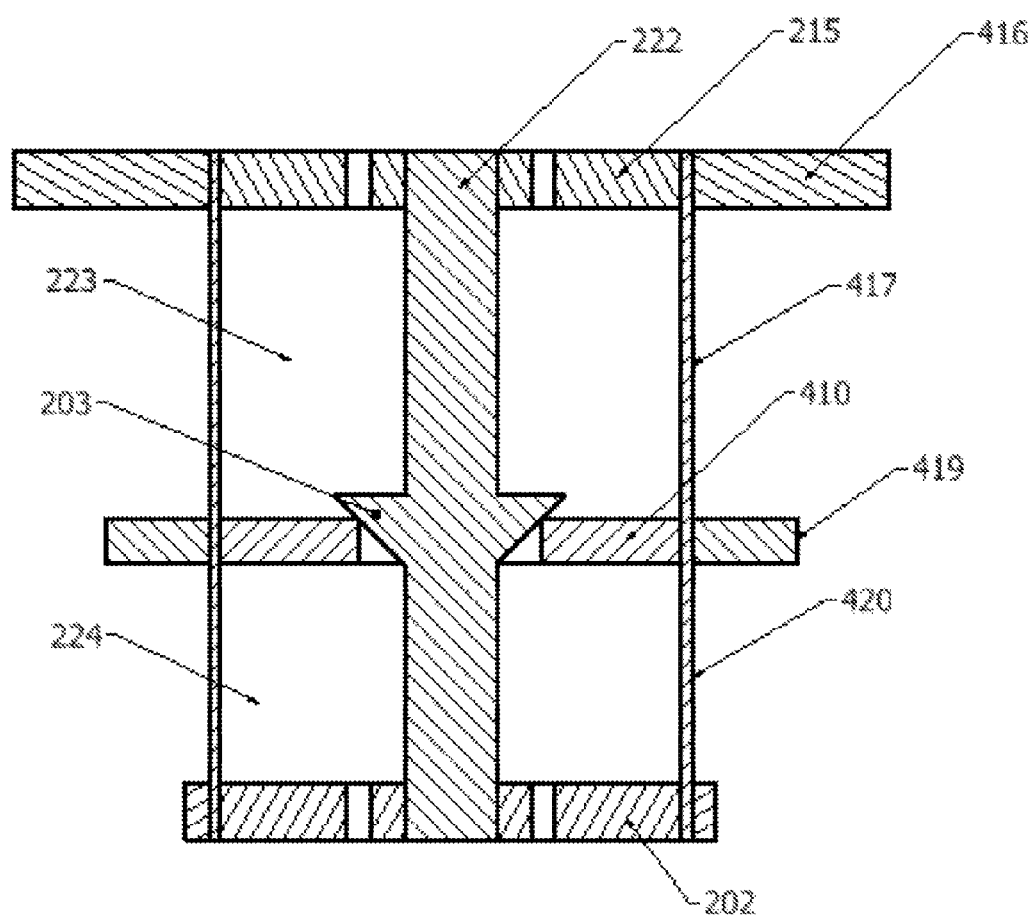

A fourth embodiment of the disposable pump can be seen in FIGS. 16a and 16b. The flexible walls of the pump are made of an elastic tube 401. The pump is divided into two chambers, the upper chamber 223 and the lower chamber 224. The two chambers are connected via the opening 227 in the seal-base 410 that is sealed by the seal-head 203. The top cap 215 has at least one through hole 240 to allow the fluid to flow from the fluid reservoir into the upper chamber 223. The reservoir (not shown) can be a collapsible bag or a rigid can with a one-way vent that will allow air to flow in but will not allow fluid to flow out. Typically the one-way vent is located on the can on the opposite side to the pump.

The nozzle 202 has at least one through hole 241 to allow the fluid to flow out from the lower chamber when the pump is actuated. The rigid seal-rod 222 which passes through the opening 227 in the seal-base 410 is connected to the top cap 215 on one end and to the nozzle 202 on the other end.

Figure 17A:
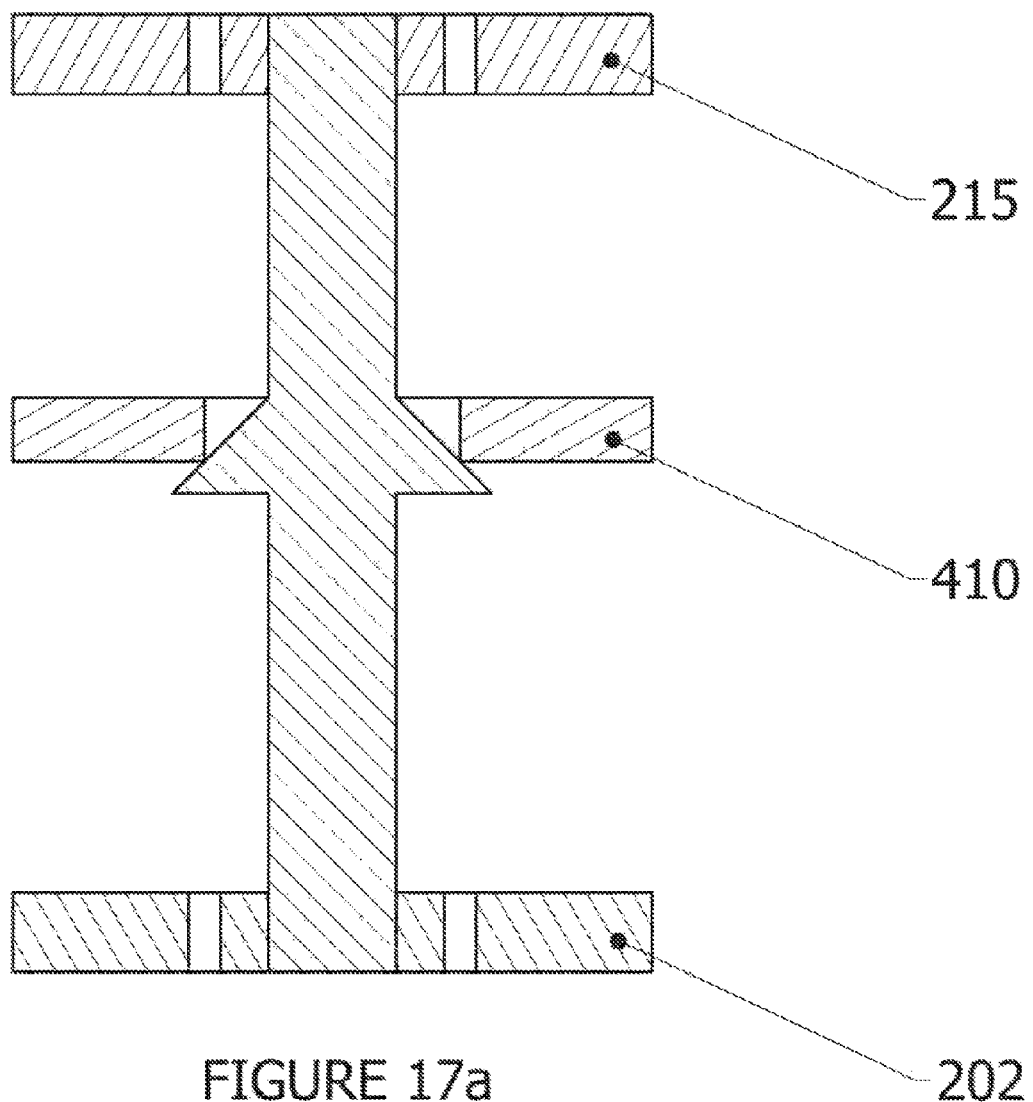

One way to assemble the disposable pump is shown in FIGS. 17a to 17d:

Step 1: Assemble the inner parts of the pump as shown in FIG. 17a. The seal-rod 222 is passed through the seal-base 410 opening with the seal-head 203 against the lower side of the seal-base 410. The top-cap 215 is coupled to the upper end of the seal-rod 222, and the nozzle 202 is coupled to the lower end of the seal-rod 222.

Figure 17B:
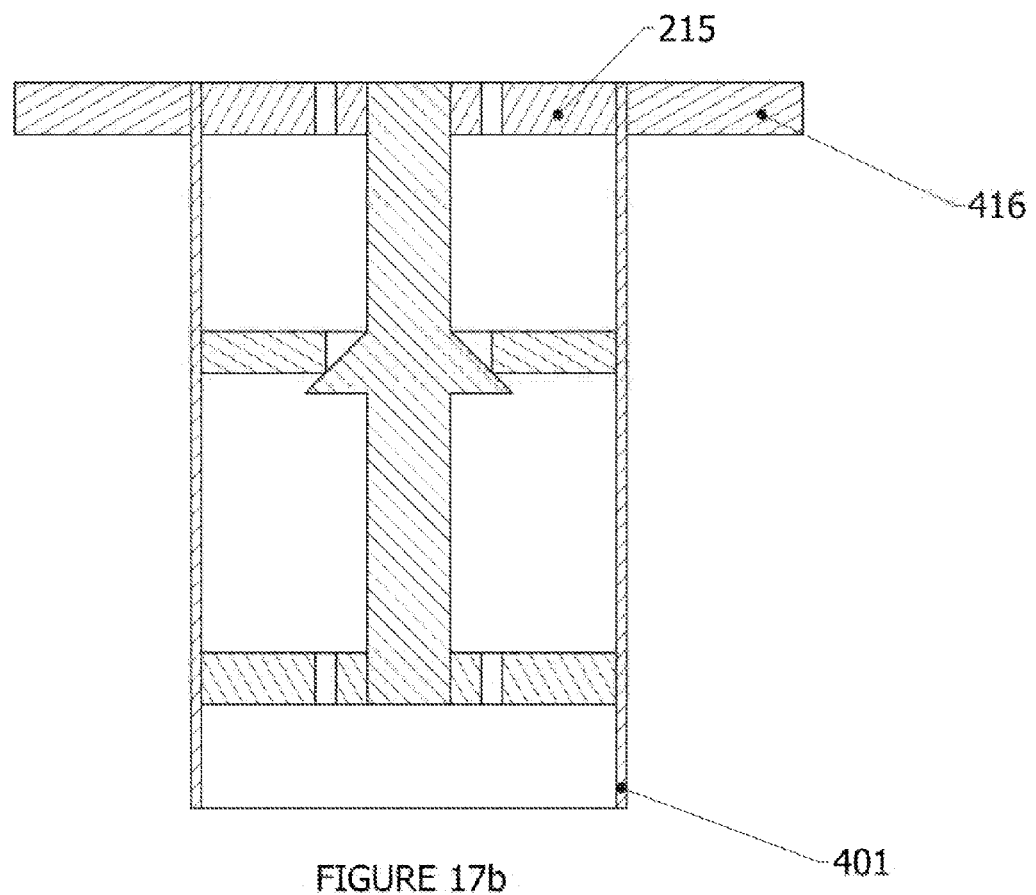

Step 2: Insert the assembled parts from step 1 inside the elastic tube 401 and clamp the elastic tube to the outer diameter of the top cap 215 using clamping ring 416 as shown in FIG. 17b to form a seal joint between the elastic tube 401 and the outer diameter of the top cap 215.

Figure 17C:
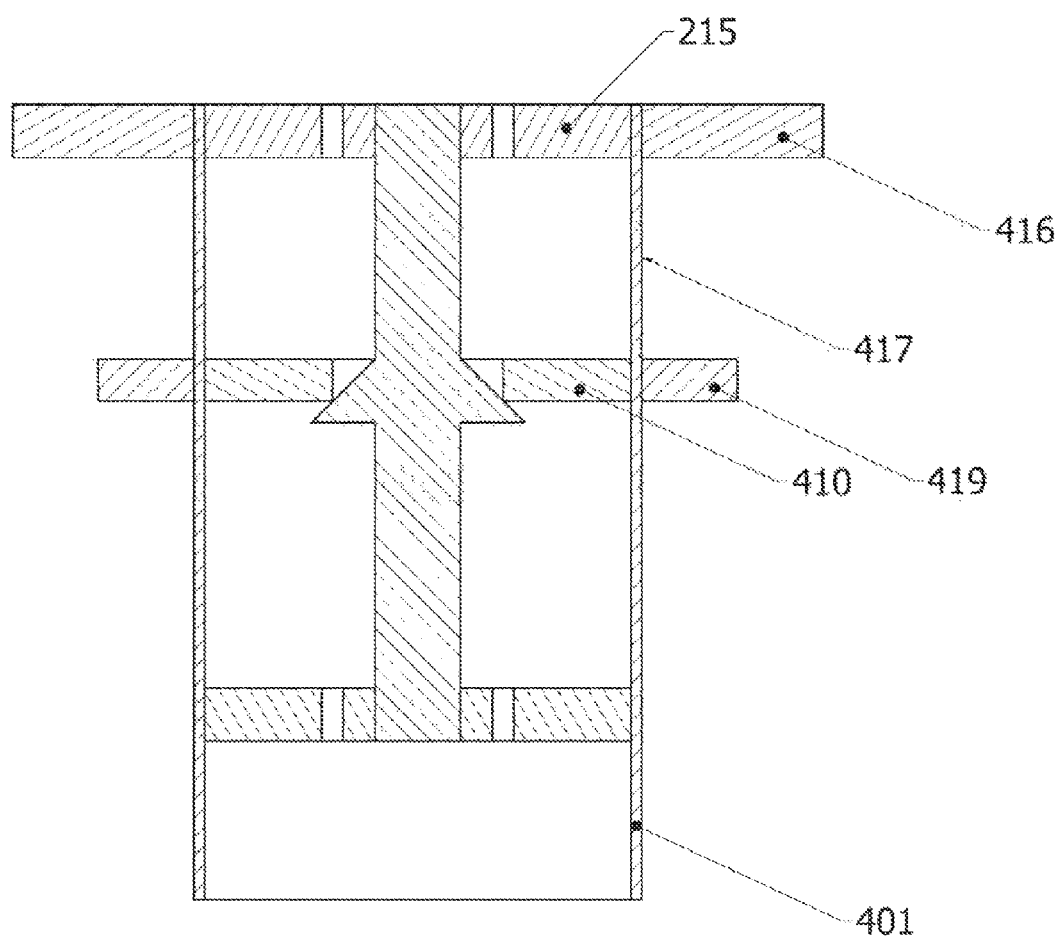

Step 3: Stretch the elastic tube 401 downward, (do not reach the elastic limit of elastic tube 401) position the seal-base 410 on top of the seal-head 203, as shown in FIG. 17c, and clamp the elastic tube 401 to the outer diameter of seal-base 410 using clamping ring 419 to form a seal joint between the elastic tube 401 and the outer diameter of the seal-base 410.

Figure 17D:
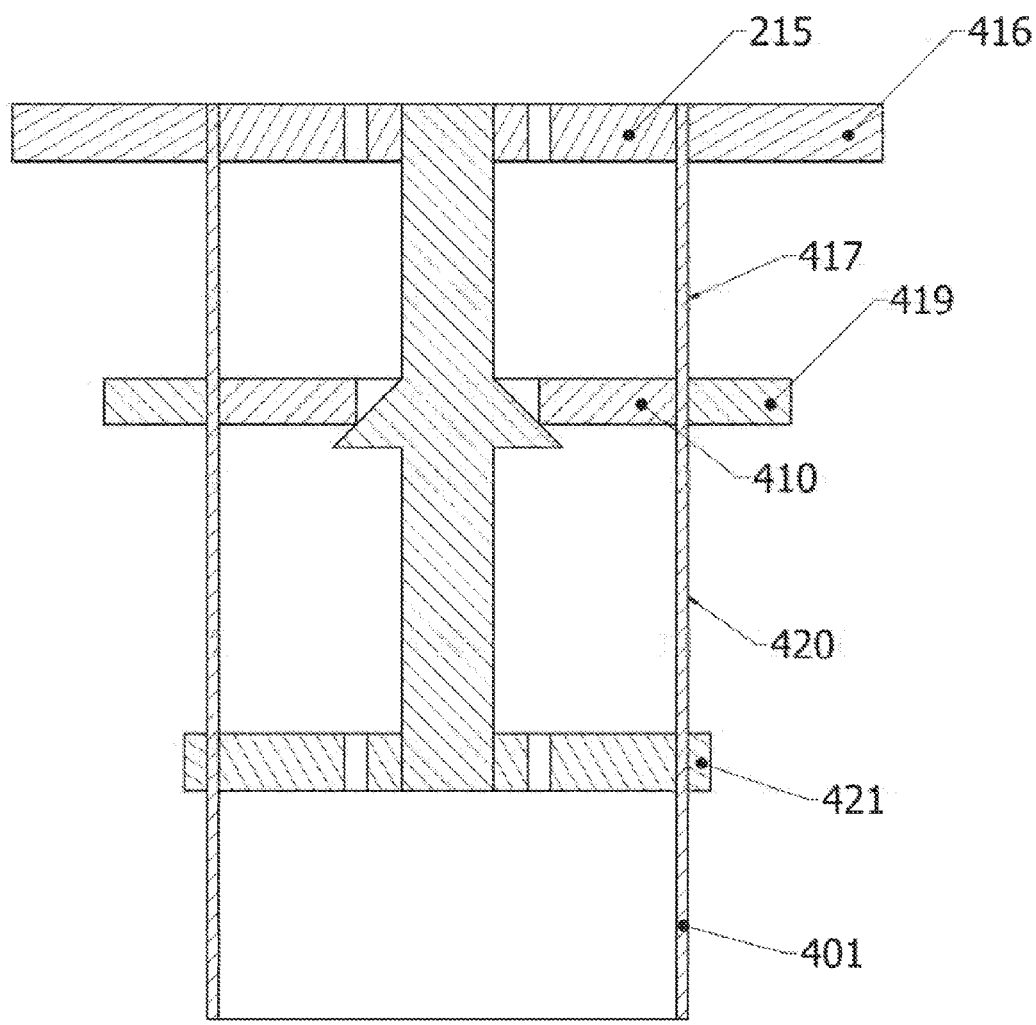

Step 4: Stretch the elastic tube 401 downward again, (do not reach the elastic limit of the elastic tube 401) and clamp the elastic tube 401 to the outer diameter of the nozzle 202 using clamping ring 421 as shown in FIG. 17d, to form a seal joint between the elastic tube 401 and the outer diameter of nozzle 202. Trim the elastic tube 401 at the nozzle 202 lower surface as can be seen in FIG. 16a.

In step 4 only the elastic tube 401 section that extends from seal-base 410 and below is stretched, since at this step the elastic tube is clamped to the seal-base 410 which rests on top of the seal-head 203, preventing further stretching of the elastic tube 401 walls 417 surrounding the upper chamber. Therefore the flexible wall 420 surrounding the lower chamber, between the seal-base 410 and the nozzle 202, is stretched more than the flexible wall 417 surrounding the upper chamber, between the top-cap 215 and the seal-base 410.

Clamping rings 416, 419 and 421 can be made from two half rings that are pressed together to form a closed ring while clamping the elastic tube 401 to the outer diameter of parts 215, 410 and 202 respectively.

A second variation on the fourth embodiment of the pump, and a method of assembling the disposable pump is shown in FIGS. 22a to 22e. In this variation, the single flexible elastic tube 401 is divided into two flexible walled sub-assemblies 500a and 500b. The subassembly surrounding the upper chamber is referred to as subassembly 500a, and the subassembly surrounding the lower chamber is 500b. Each subassembly 500 is comprised of a short section of flexible walled elastic tube 503 with a plastic ring 501 attached to its upper end and its lower end. Subassembly 500a for the upper chamber can be made the same as the subassembly 500b for the lower chamber, or the walls of the subassemblies can be made different lengths or from different elastic materials.

Step 1: Plastic rings 501a1 and 501a2 are attached to the upper and lower ends, respectively, of flexible walled elastic tube 503a by a molding process or by any other method that can bond elastic material to plastic, forming subassembly 500a, FIG. 22a. Similarly, plastic rings 501b1 and 501b2 are attached to the ends of flexible walled elastic tube 503b by a molding process or by any other method that can bond elastic material to plastic, forming subassembly 500b.

Figure 22A:
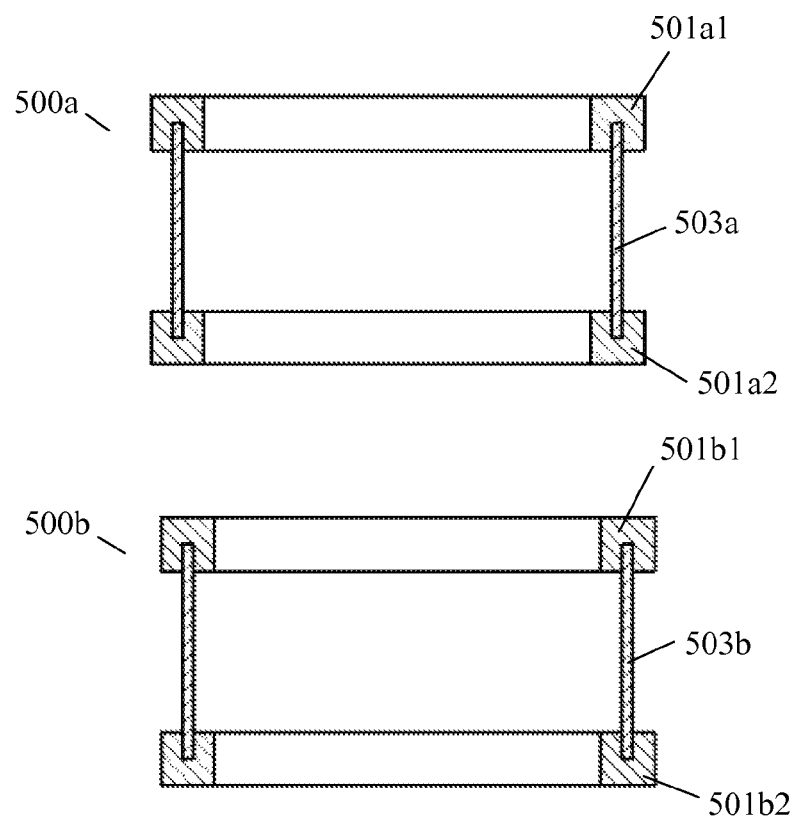
Figure 22B:
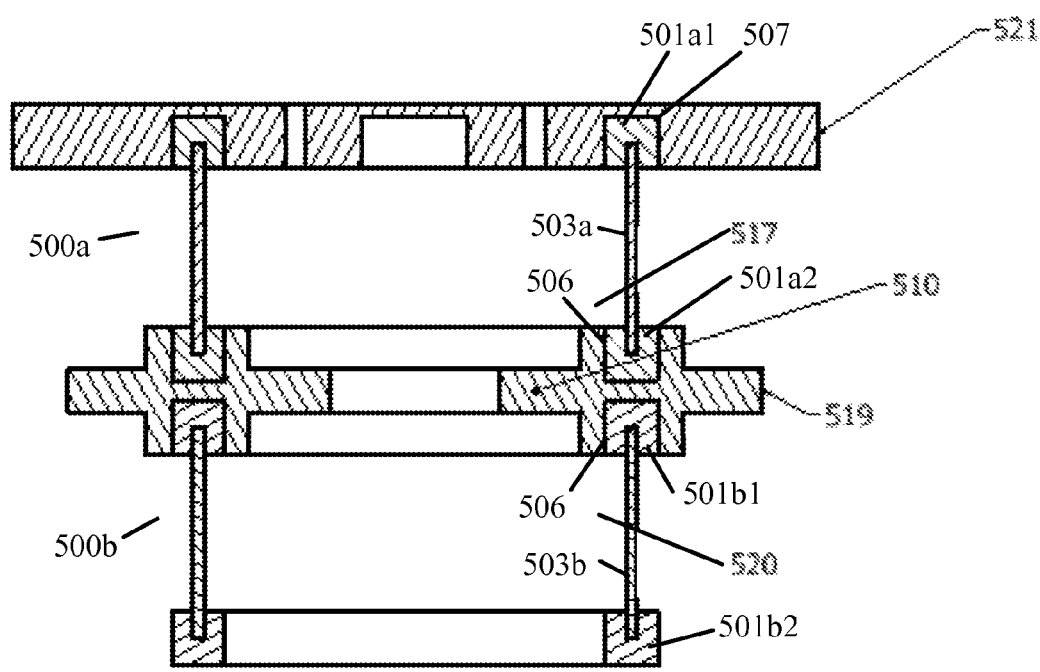

Step 2: The second step in the assembly of the disposable pump is shown in FIG. 22b. The upper ring 501a1 of subassembly 500a of the upper chamber 517 is attached to the top-cap 521 and its lower ring 501a2 is attached to the upper side of the seal-base 510. The upper ring 501b1 of subassembly 500b of the lower chamber 520 is also connected to the lower side of the seal base 510. These attachments may be done as shown in FIG. 22b by providing grooves 506 and 507 on the surfaces of the seal-base 519 and top-cap 521, respectively, into which the rings 501a1, 501a2 and 501b1 can be inserted and rigidly connected by adhesive or other means, or the rings could be fastened to the surfaces of the top-cap and seal-base without grooves, or other means of connection could be used.

Step 3: The third step in the assembly of the disposable pump is shown in FIG. 22c. In this step, nozzle 502 is rigidly attached to the bottom end of seal-rod 222.

Step 4: In the fourth step of the assembly of the disposable pump, shown in FIG. 22d, the combination of nozzle 502 and seal-rod 222 from step 3 are combined with the parts assembled in step 2. The seal rod 222 is inserted through the opening of the seal-base 510, and its upper end is rigidly connected to the top-cap 521. Note that the lengths of the flexible walled tubes 503a and 503b have been selected such that when the pump is assembled in this step, a gap remains between the lower ring 501b2 of the lower chamber 520 subassembly 500b and the upper surface of the nozzle 502.

Figure 22E:
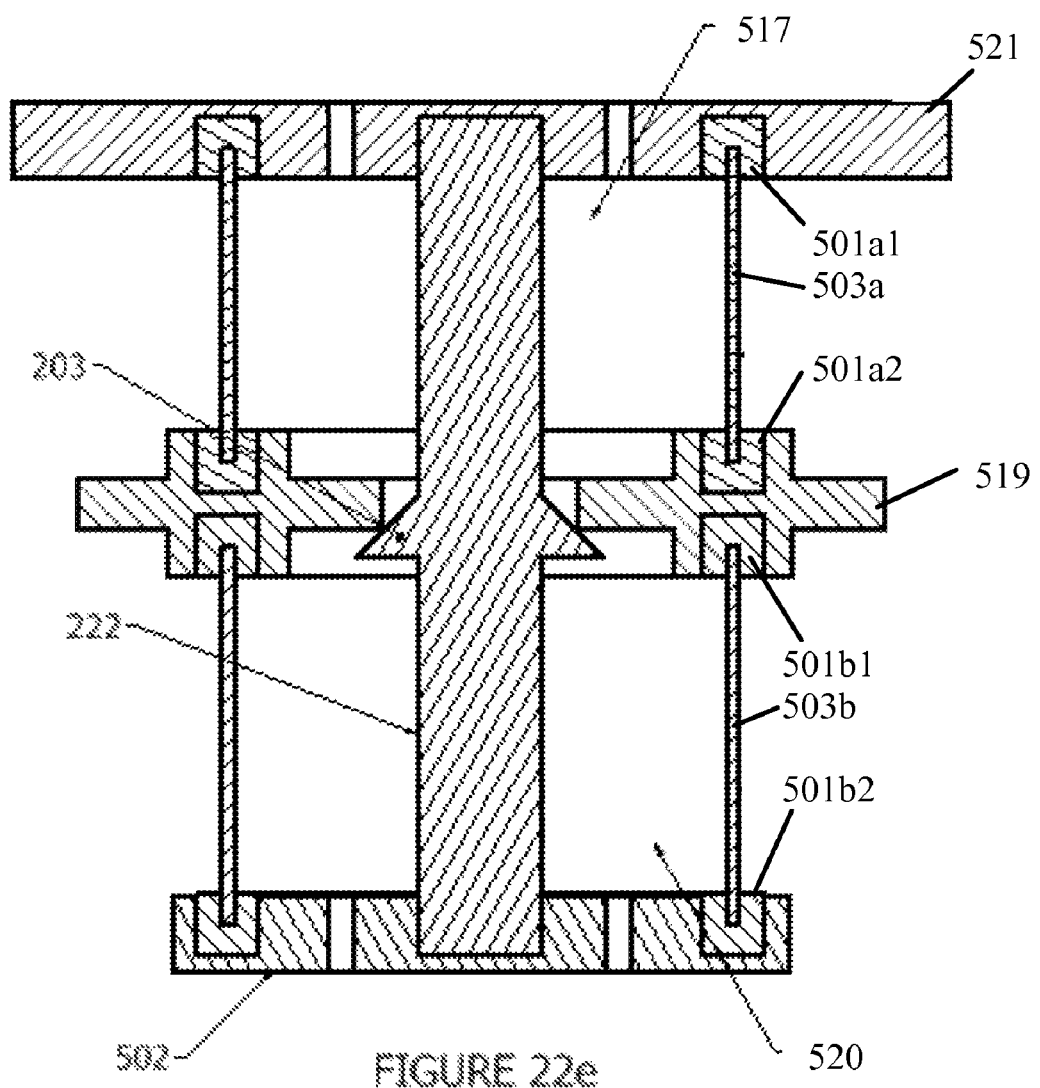

Step 5: The final assembly step is shown in FIG. 22e, in which the lower ring 501b2 of the lower chamber 520 subassembly 500b is attached to the upper surface of the nozzle 502. This may be done as shown in FIGS. 22d and 22e by providing a groove 505 on the upper surface of the nozzle 502, into which the ring 501b2 can be inserted and rigidly connected by adhesive or other means, or the ring 501b2 could be fastened to the upper surface of the nozzle without grooves, or other means of connection could be used. The flexible walls 503a of the upper chamber 517 are stretched until the seal-base 510 is resting on top of the seal-head 203, then the flexible walls 503b of the lower chamber 520 are stretched until the bottom ring 501b2 of subassembly 500b of the lower chamber 520 can be fixed to nozzle 502 as discussed above.

The substance and length of walls 503a of subassembly 500a of the upper chamber 517, the substance and length of walls 503b of subassembly 500b of the lower chamber 520, the length of the seal-rod 222 and the position of the seal-head 203 on the seal rod 222 are selected in such a way that in the final assembly the flexible wall 503b surrounding the lower chamber 520, between the seal-base 510 and the nozzle 202, is stretched more than the flexible wall 503a surrounding the upper chamber 517, between the top-cap 215 and the seal-base 510.

The restoring force of an elastic material is governed by Hooke's law. Mathematically, Hooke's law states that $F=-kx$, where x is the displacement of the elastic tube end from its equilibrium position.

F is the restoring force exerted by elastic tube.

k is a constant called the rate or spring constant of the elastic tube which depends on the elasticity of the elastic tube material. This law holds until the elastic material reaches its elastic limit.

The restoring force of the flexible walls of the upper and lower chambers is chosen to provide a net restoring force which acts to press the seal-head 203 into the seal base 410, closing the seal-base opening. In the example shown, since the elastic flexible wall 420 of the lower chamber 224 is stretched more than the elastic flexible wall 417 of the upper chamber 223, the restoring force of the stretched flexible wall 420 of the lower chamber, pulling the seal-base 410 downward onto the seal-head 203, is larger than the restoring force of the stretched flexible wall 417 of the upper chamber, which pulls the seal-base 410 upward away from the seal-head 203. As a result the net restoring force of the flexible walls of the pump is downward, pulling the seal-base 410 onto the seal-head 203, sealing the opening 227 in the seal-base 410 and isolating the upper chamber 223 from the lower chamber 224.

If a larger net restoring force is desired the elastic flexible wall 420 of the lower chamber 224 can be made longer than the elastic flexible wall 417 of the upper chamber 223 which by Hooke's law will increase the restoring force of the elastic flexible wall 420 of the lower chamber 224.

In FIG. 16a the seal-head 203 is positioned in the lower chamber 224 and the net restoring force pulls the seal-base 410 downward against the seal head to seal the opening 227 in the seal base on the lower side of the seal-base (first position). While in FIG. 16b the seal-head 203 is positioned in the upper chamber 223 and the net force pulls the seal-base 410 upward sealing the opening 227 in the seal base on the upper side of the seal base 410 (first position). When the pump in FIG. 16a is actuated, the actuator push the seal base 410 upward to the second position opening the seal base opening 227. When the actuator is deactivated the net restoring force of the flexible elastic walls pulls the seal base 410 downward to its first position. While, when the pump in FIG. 16b is actuated, the actuator pushes the seal base 410 downward to the second position opening the seal base opening 227. When the actuator is deactivated the net restoring force of the flexible elastic walls pulls the seal base 410 upward to its first position.

Figure 18:
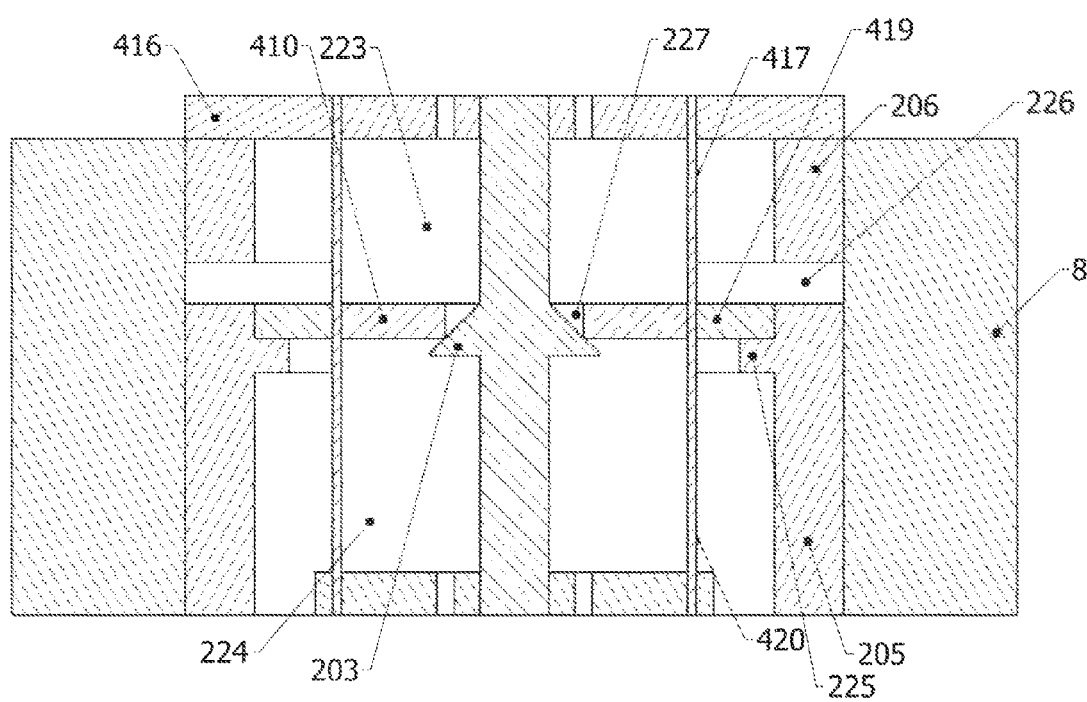
FIG. 18 shows a cross section of the fourth embodiment of FIG. 16a, inserted in a solenoid actuator.
Figure 19:
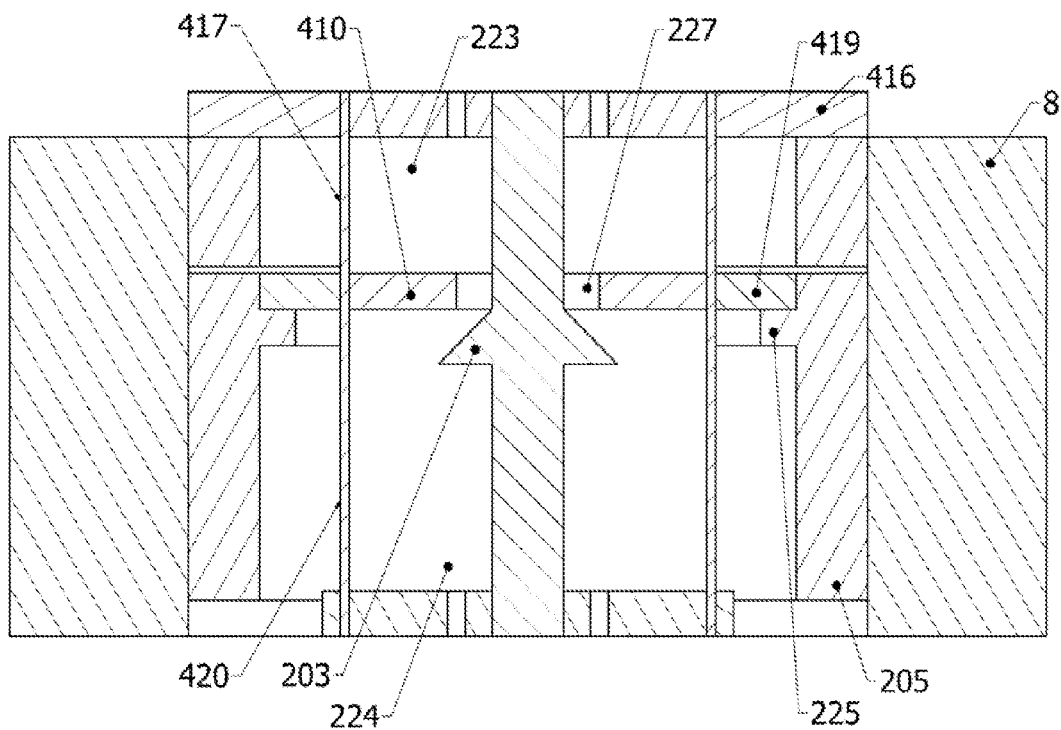
FIG. 19 shows a cross section of the fourth embodiment of FIG. 16a, inserted in a solenoid actuator, when the solenoid is activated.

The pump can be actuated either by a mechanical or pneumatic actuator or a solenoid actuator. Actuating by a solenoid is shown in FIGS. 18 and 19. FIG. 18 shows the pump status when the solenoid 8 is not activated and FIG. 19 shows the pump status when the solenoid is activated. It will be understood that a fluid reservoir (not shown) is connected to the top of the pump.

The clamping ring 416 is firmly held against the top of the solenoid 8 so the pump can't move when it is actuated by the solenoid. On the other end of the pump the nozzle 202, which is connected rigidly to the seal-rod 222, also cannot move when the solenoid 8 is activated. The clamping ring 419, which is rigidly clamped to the seal-base 410, rests on top of the plunger 205 lifting tabs 225, as can be seen in FIG. 18. A pole piece 206 is inside the solenoid 8, around the upper chamber 223. A gap 226 between the pole piece 206 and the plunger 205 defines the limit of upward movement of the plunger 205.

When solenoid 8 is not activated the seal-base 410 is in its first position, held firmly against the seal-head 203 by the restoring force of the flexible wall 420 of the lower chamber 224 of the pump as was explained above, closing the opening 227 in the seal-base 410 and isolating the upper chamber 223 from the lower chamber 224.

When solenoid 8 is activated the plunger 205 is pulled upward by the magnetic field to close the gap 226 between it and the pole piece 206. The seal-base 410 which is coupled to the plunger 205 via the clamping ring 419 is pushed upward into its second position as can be seen in FIG. 19. The flexible wall 417 of the upper chamber 223 is shortened, decreasing the restoring force in that chamber, while the flexible wall 420 of the lower chamber 224 is elongated, increasing the restoring force in that chamber. As a result the net restoring force downward acting on the seal-base 410 is increased.

When the seal-base 410 is pushed upward by the solenoid plunger 205, the upper chamber 223 volume is decreased while the lower chamber 224 volume in increased, and the seal between the chambers opens. The liquid from the decreasing volume of the upper chamber 223 is forced by the moving seal-base 410 upward to flow into the expending volume of the lower chamber 224.

When solenoid 8 is deactivated the downward net elastic restoring force will pull the seal-base 410 downward and will force the fluid from the now expended lower chamber 224 out through the nozzle openings. This process will continue until the seal-base 410 reaches its initial position on top of the seal-head 203. At the same time, when the seal-base 410 is pulled downward by the net elastic restoring force, the upper chamber 223 volume is expanding. The increasing volume of the upper chamber 223 will be refilled by fluid from the reservoir (not shown) through the openings in the top-cap 215 by the suction effect of the expanding volume of the upper chamber 223.

Typically the time interval between successive strokes of the actuator should be equal or greater than the time it takes the seal-base 410 to move to its initial position on top of the seal-head 203 to ensure that the liquid quantity dispensed per stroke will be the same.

Figure 20:
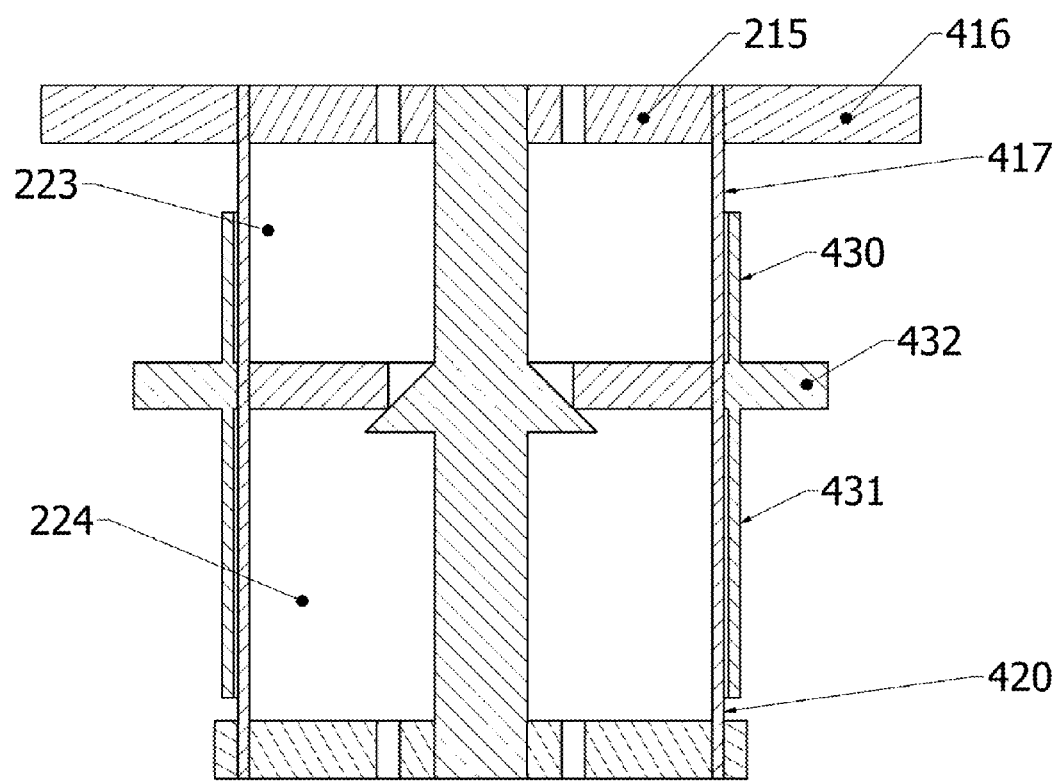
FIG. 20 shows a cross section of the forth embodiment of FIG. 16a, with external shielding tubes.

External shielding rigid tube 430 can be placed around the upper chamber 223 flexible wall 417 and 431 and around the lower chamber 224 flexible wall 420, as can be seen in FIG. 20. These rigid tubes can be part of the clamping ring 432, as can also be seen in FIG. 20. The shielding tubes 430 and 431 guard the flexible walls of the upper and lower chambers during shipping and handling, and, if the flexible walls are not strong enough to maintain their diameter when fluid pressure in a chamber increases, the tubes 430 and 431 prevent the flexible walls of the upper and lower chambers from expanding outward.

Figure 21:
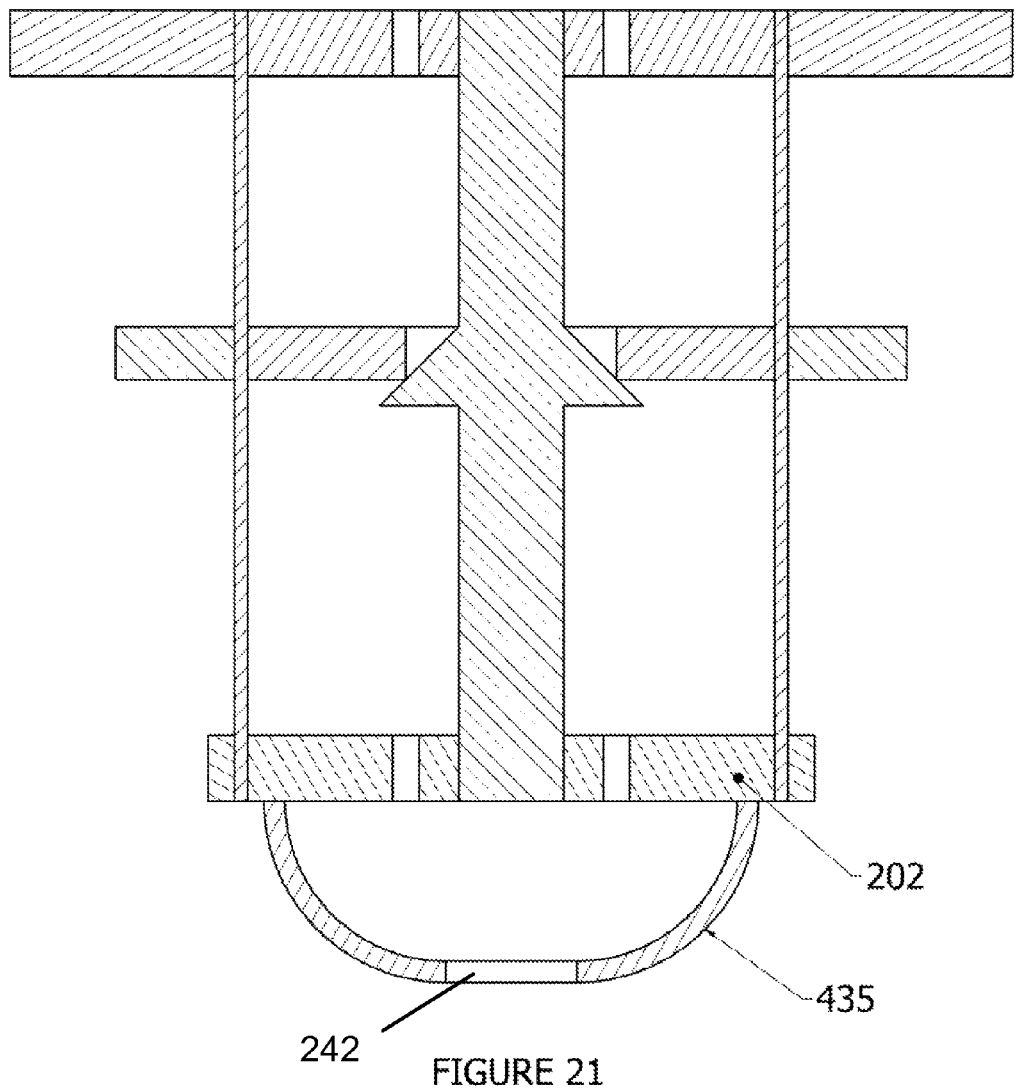
FIG. 21 shows a cross section of the forth embodiment of FIG. 16a, with modified nozzle with a single central exit hole.

In FIG. 21 an additional lower nozzle 435 with a single central exit hole 242 is shown. The lower nozzle 435 provides a central exit for fluid, and could be adapted to provide an attachment point for tubing, if desired.

The main advantages of the fourth embodiment of the disposable pump are that it has a simple structure without any internal moving parts, and it is simple and inexpensive to manufacture. It can be actuated by either mechanical, pneumatic or solenoid actuator, and because it has no internal moving parts it can dispense high viscosity liquid.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A pump for use with a fluid reservoir, comprising:
    a) a hollow pump body comprising flexible walls having an inner surface and an outer surface, a first end for connecting to the reservoir and a second end for dispensing liquid,
    b) a top-cap sealed to the first end of the pump body, having at least one through hole for passage of fluid from the reservoir into the pump body;
    c) a nozzle sealed to the second end of the pump body, having at least one through hole for passage of fluid out from the pump body;
    d) a seal-base located between the nozzle and the top-cap, having a central seal-base opening, the seal-base dividing the pump body into an upper chamber between the seal-base and the top-cap and a lower chamber between the seal-base and the nozzle;
    e) a rigid seal-rod extending along an axis of the pump body from the top-cap to the nozzle through the seal-base opening, having a seal-head for sealing the opening in the seal-base by sealing against a side of the seal-base;
    the seal-base being movable from a first position in which the seal-head is sealed against a side of the seal-base, blocking flow of liquid through the opening in the seal-base, to a second position in which the seal-head is not in contact with the seal-base, allowing flow of liquid through the opening in the seal-base;
    the flexible walls surrounding the upper chamber being held in a stretched condition by the seal-rod, creating a restoring force between the top-cap and the seal-head; and the flexible walls surrounding the lower chamber being held in a stretched condition by the seal-rod, creating a restoring force between the seal-head and the nozzle;
    the restoring force of the flexible walls surrounding the lower chamber and the restoring force of the flexible walls surrounding the upper chamber, being selected to create a net restoring force pulling the seal-base into the first position and pressing the seal-head into the opening in the seal-base, sealing the seal-base opening and isolating the upper chamber from the lower chamber;
    such that when the seal-base is reciprocally moved parallel to the axis of the pump body, the seal-base is moved between the first position and the second position.

2. The pump of claim 1, in which the flexible walls of the pump body comprise an elastic tube, and the top-cap, the seal-head and the nozzle are located inside the elastic tube, and the pump further comprises a plurality of clamping rings surrounding the elastic tube for clamping the top-cap, the seal-head and the nozzle to the elastic tube.

3. The pump of claim 1, in which the flexible walls of the pump body comprise an upper tube section surrounding the upper chamber and a lower tube section surrounding the lower chamber, and the upper tube section and the lower tube section each comprise a mounting ring at each end, the mounting rings being sealed to the top-cap, the seal-head and the nozzle.

4. The pump of claim 1, further comprising:
    a solenoid coil surrounding the pump body and coupled to the top-cap; and
    a plunger slideably movable inside the solenoid coil and surrounding at least part of the lower chamber, coupled to the seal-base;
    a pole piece inside the solenoid coil and surrounding at least part of the upper chamber, the pole piece being separated from the plunger by a gap;
    such that when the solenoid coil is actuated, the plunger is drawn magnetically toward the pole piece, moving the seal-head between the first position and the second position.

5. The pump of claim 1, further comprising a reservoir having an output coupled to the first end of the pump body.

6. The pump of claim 5, in which the collapsible reservoir is a bag-in-box.

7. The pump of claim 1, further comprising an upper rigid tube surrounding substantially all of the flexible walls of the upper chamber.

8. The pump of claim 7, in which the upper rigid tube is coupled to the seal-head.

9. The pump of claim 7, in which the upper rigid tube is coupled to the top-cap.

10. The pump of claim 1, further comprising a lower rigid tube surrounding substantially all of the flexible walls of the lower chamber.

11. The pump of claim 10, in which the lower rigid tube is coupled to the seal-head.

12. The pump of claim 10, in which the lower rigid tube is coupled to the nozzle.

13. The pump of claim 1, further comprising a lower nozzle mounted to the pump body below the nozzle, having a central fluid exit hole.

14. A method of assembling a pump for use with a fluid reservoir, the pump comprising a hollow pump body comprising an elastic tube with flexible walls having an inner surface and an outer surface, a first end for connecting to the reservoir and a second end for dispensing liquid, a top-cap having an outer diameter, a top-cap clamping ring, a nozzle having an outer diameter, a nozzle clamping ring, a seal-base having a seal-base opening and an outer diameter, a seal-base clamping ring, a rigid seal-rod having an upper end, a lower end, and a length therebetween, and a seal-head along the length of the seal-rod for sealing the opening in the seal-base by sealing against a side of the seal-base, the method comprising:
  a) passing the seal-rod through the seal-base opening, with the seal-head against a side of the seal-base;
  b) coupling the top-cap to the upper end of the seal-rod;
  c) coupling the nozzle to the lower end of the seal-rod;
  d) inserting the top-cap, seal-base, nozzle and seal-rod inside the elastic tube;
  e) clamping the elastic tube to the outer diameter of the top cap using the top-cap clamping ring to form a seal joint between the elastic tube and the outer diameter of the top cap;
  f) stretching the elastic tube downward until the seal-base is positioned on top of the seal-head;
  g) clamping the elastic tube to the outer diameter of the seal-base using the seal-base clamping ring to form a seal joint between the elastic tube and the outer diameter of the seal-base;
  h) stretching the elastic tube further downward; and
  i) clamping the elastic tube to the outer diameter of the nozzle using the nozzle clamping ring to form a seal joint between the elastic tube and the outer diameter of nozzle.

15. The method of claim 14, further comprising trimming the elastic tube around the nozzle.

16. A method of assembling a pump for use with a fluid reservoir, the pump comprising a hollow pump body comprising an upper chamber subassembly comprising an elastic tube with flexible walls, an upper ring and a lower ring, a lower chamber subassembly comprising an elastic tube with flexible walls, an upper ring and a lower ring, a first end for connecting to the reservoir and a second end for dispensing liquid, a top-cap, a nozzle, a seal-base having a seal-base opening, a rigid seal-rod having an upper end, a lower end, and a length therebetween, and a seal-head along the length of the seal-rod for sealing the opening in the seal-base by sealing against a side of the seal-base, the method comprising:
  a) attaching an upper ring and a lower ring to ends of the flexible walls of the upper chamber subassembly;
  b) attaching an upper ring and a lower ring to ends of the flexible walls of the lower chamber subassembly;
  c) attaching the upper ring of the upper chamber subassembly to the top-cap;
  d) attaching the lower ring of the upper chamber subassembly to the seal-base;
  e) attaching the upper ring of the lower chamber subassembly to the seal-base;
  f) attaching the nozzle to the lower end of the seal-rod;
  g) inserting the seal rod through the seal-base opening;
  h) connecting the upper end of the seal-rod to the top-cap;
  i) stretching the flexible walls of the upper chamber subassembly until the seal-base is resting on the seal-head;
  j) stretching the flexible walls of the lower chamber subassembly until the lower ring of the lower chamber subassembly can be fixed to the nozzle; and
  k) rigidly fixing the lower ring of the lower chamber subassembly to the nozzle.

* * * * *